(12) United States Patent
Kim

(10) Patent No.: US 9,352,689 B2
(45) Date of Patent: May 31, 2016

(54) DRIVER ASSISTANCE APPARATUS CAPABLE OF DIAGNOSING VEHICLE PARTS AND VEHICLE INCLUDING THE SAME

(71) Applicant: LG ELECTRONICS INC., Seoul (KR)

(72) Inventor: Ikkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/671,145

(22) Filed: Mar. 27, 2015

(65) Prior Publication Data

US 2015/0343951 A1    Dec. 3, 2015

(30) Foreign Application Priority Data

May 30, 2014    (KR) .................. 10-2014-0065737

(51) Int. Cl.
*B60R 1/00* (2006.01)
*B60W 10/20* (2006.01)
(Continued)

(52) U.S. Cl.
CPC .............. *B60R 1/00* (2013.01); *B60G 17/0195* (2013.01); *B60G 17/06* (2013.01); *B60T 7/22* (2013.01); *B60T 8/885* (2013.01); *B60T 17/22* (2013.01); *B60W 10/18* (2013.01); *B60W 10/20* (2013.01); *B60W 50/0205* (2013.01); *B60W 50/14* (2013.01); *B62D 5/0481* (2013.01); *G06K 9/00791* (2013.01); *G07C 5/02* (2013.01); *B60G 2500/10* (2013.01); *B60R 2300/107* (2013.01); *B60T 2201/089* (2013.01); *B60T 2210/32* (2013.01); *B60T 2270/413* (2013.01);
(Continued)

(58) Field of Classification Search
CPC ....... B60R 1/00; B60R 2300/107; B60T 7/22; B60T 17/22; B60T 2270/413; G06K 9/00791; B62D 5/0481; B60W 50/0025; B60W 50/14; B60W 10/20; B60W 10/18; B60W 2540/12; B60W 2550/30; B60W 2550/22; B60W 2050/022; B60W 2420/42; B60W 2540/18; G07C 5/02

See application file for complete search history.

(56) References Cited

U.S. PATENT DOCUMENTS 9,218,698 B2 * 12/2015 Ricci .................. H04W 48/04
2005/0234622 A1 * 10/2005 Pillar ................... A62C 27/00
                                                                      701/41

(Continued)

FOREIGN PATENT DOCUMENTS

JP      2002-274403 A    9/2002
KR   10-2010-0039638 A   4/2010

(Continued)

OTHER PUBLICATIONS

Korean Office Action issued in Application No. 10-2014-0065737 dated Jun. 25, 2015.
European Search Report issued in Application No. 15169816.4 dated Oct. 9, 2015.

*Primary Examiner* — McDieunel Marc
*Assistant Examiner* — James E Stroud
(74) *Attorney, Agent, or Firm* — Ked & Associates LLP

(57) ABSTRACT

A driver assistance apparatus and a vehicle including the same are disclosed. The driver assistance apparatus includes a stereo camera, a sensor unit to sense a travel state of a vehicle, and a processor to diagnose a part of the vehicle based on stereo images received from the stereo camera and vehicle travel state information sensed by the sensor unit. Consequently, it is possible to easily diagnose parts of the vehicle that may be in need of repair or replacement.

19 Claims, 26 Drawing Sheets

(51) Int. Cl.
  *B60W 10/18* (2012.01)
  *G07C 5/02* (2006.01)
  *B60W 50/02* (2012.01)
  *B60W 50/14* (2012.01)
  *B62D 5/04* (2006.01)
  *G06K 9/00* (2006.01)
  *B60T 7/22* (2006.01)
  *B60T 17/22* (2006.01)
  *B60G 17/0195* (2006.01)
  *B60G 17/06* (2006.01)
  *B60T 8/88* (2006.01)

(52) U.S. Cl.
  CPC ...... *B60W2050/022* (2013.01); *B60W 2420/42* (2013.01); *B60W 2540/12* (2013.01); *B60W 2540/18* (2013.01); *B60W 2550/22* (2013.01); *B60W 2550/30* (2013.01)

(56) References Cited

U.S. PATENT DOCUMENTS

| | | | |
|---|---|---|---|
| 2007/0228703 A1* | 10/2007 | Breed | B60N 2/0232 280/735 |
| 2011/0178671 A1 | 7/2011 | Bae et al. | |
| 2012/0072050 A1* | 3/2012 | Naka | B60W 30/09 701/1 |
| 2014/0098196 A1* | 4/2014 | Guan | G06K 9/00798 348/47 |
| 2015/0344032 A1* | 12/2015 | Oh | B60W 30/16 701/37 |

FOREIGN PATENT DOCUMENTS

| | | |
|---|---|---|
| KR | 10-2011-0073917 A | 6/2011 |
| KR | 10-2013-0055836 A | 5/2013 |
| WO | WO 2013/018961 A1 | 2/2013 |
| WO | WO 2014/035320 A1 | 3/2014 |

* cited by examiner

DRIVER ASSISTANCE APPARATUS CAPABLE OF DIAGNOSING VEHICLE PARTS AND VEHICLE INCLUDING THE SAME

CROSS-REFERENCE TO RELATED APPLICATION

This application claims priority benefit of under 35 U.S.C. §119 to Korean Patent Application No. 10-2014-0065737, filed on May 30, whose entire disclosure is hereby incorporated by reference.

BACKGROUND OF THE INVENTION

1. Field

The present disclosure relates to a driver assistance apparatus and a vehicle including the same and, more particularly, to a driver assistance apparatus that is capable of easily diagnosing vehicle parts and a vehicle including the same.

2. Background

A vehicle is a device that allows a driver to move in a desired direction. A representative example of the vehicle may be a car or automobile.

In order to improve convenience of a user who uses the vehicle, the vehicle is equipped with various sensors and electronic devices. In particular, various devices to improve the driving convenience of the user are disclosed.

SUMMARY OF THE INVENTION

It is an object of the present disclosure to provide a driver assistance apparatus that is capable of easily diagnosing vehicle parts and a vehicle including the same.

In accordance with an aspect of the present disclosure, the above and other objects can be accomplished by the provision of a driver assistance apparatus including a stereo camera, a sensor unit to sense a travel state of a vehicle, and a processor to diagnose a part of the vehicle based on stereo images received from the stereo camera and vehicle travel state information sensed by the sensor unit.

In accordance with another aspect of the present disclosure, there is provided a vehicle including a steering drive unit to drive a steering apparatus, a brake drive unit to drive a brake apparatus, a controller to control the steering drive unit and the brake drive unit, a stereo camera, a sensor unit to sense a travel state of a vehicle, and a processor to diagnose a part of the vehicle based on stereo images received from the stereo camera and vehicle travel state information sensed by the sensor unit.

BRIEF DESCRIPTION OF THE DRAWINGS

The embodiments will be described in detail with reference to the following drawings in which like reference numerals refer to like elements wherein.

DETAILED DESCRIPTION

Exemplary embodiments of the present disclosure will be described with reference to the attached drawings.

The terms "module" and "unit," when attached to the names of components are used herein to help the understanding of the components and thus they should not be considered as having specific meanings or roles. Accordingly, the terms "module" and "unit" may be used interchangeably.

A vehicle as described in this specification may include a car and a motorcycle. Hereinafter, a description will be given based on a car.

On the other hand, a vehicle as described in this specification may include a vehicle having an engine, a hybrid vehicle having an engine and an electric motor, and an electric vehicle having an electric motor, and the like. Hereinafter, a description will be given based on a vehicle having an engine.

A driver assistance apparatus as described in this specification may be an advanced driver assistance system (hereinafter, "ADAS") or an advanced driver assistance apparatus (hereinafter, "ADAA"). Hereinafter, a description will be given of various embodiments of a driver assistance apparatus according to the present disclosure and a vehicle including the same.

Figure 1:
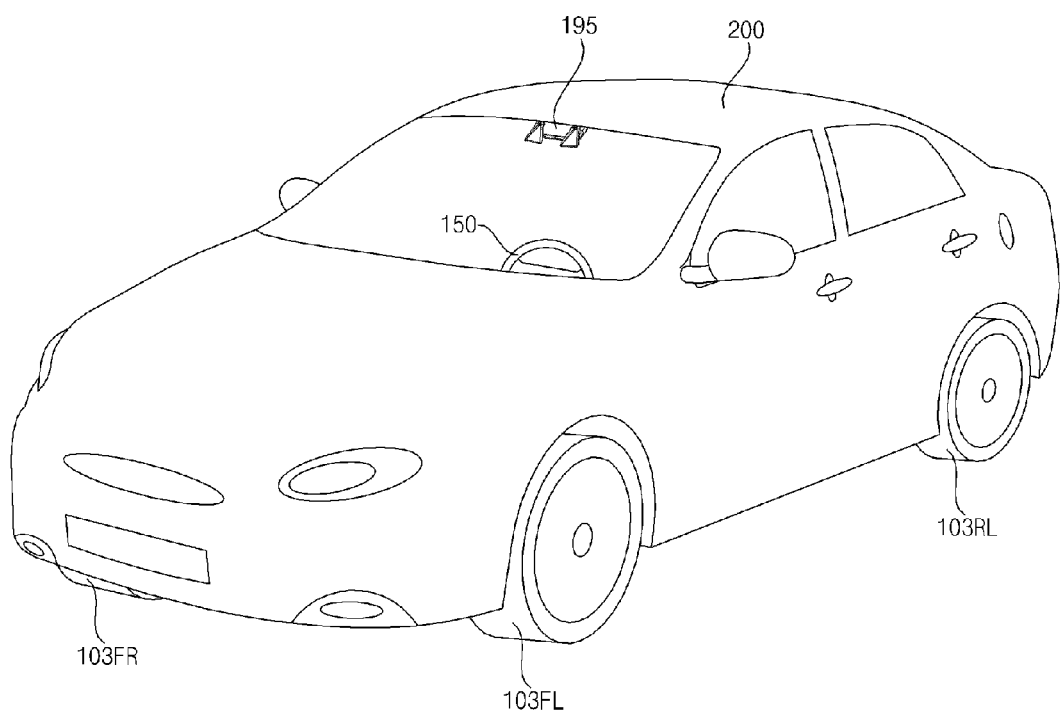
FIG. 1 is a view showing the external appearance of a vehicle having a stereo camera according to an embodiment of the present disclosure.

FIG. 1 shows the external appearance of a vehicle having a stereo camera according to an embodiment of the present disclosure.

Referring to FIG. 1, a vehicle 200 may include a wheels 103FR, 103FL, 103RL, and the like, a steering wheel 150, and a stereo camera 195 provided in the vehicle 200.

The stereo camera 195 may include a plurality of cameras. Stereo images acquired by the cameras may be signal-processed in a driver assistance apparatus 100 (see FIG. 3).

By way of example, FIG. 1 shows that the stereo camera 195 may include two cameras.

Figure 2:
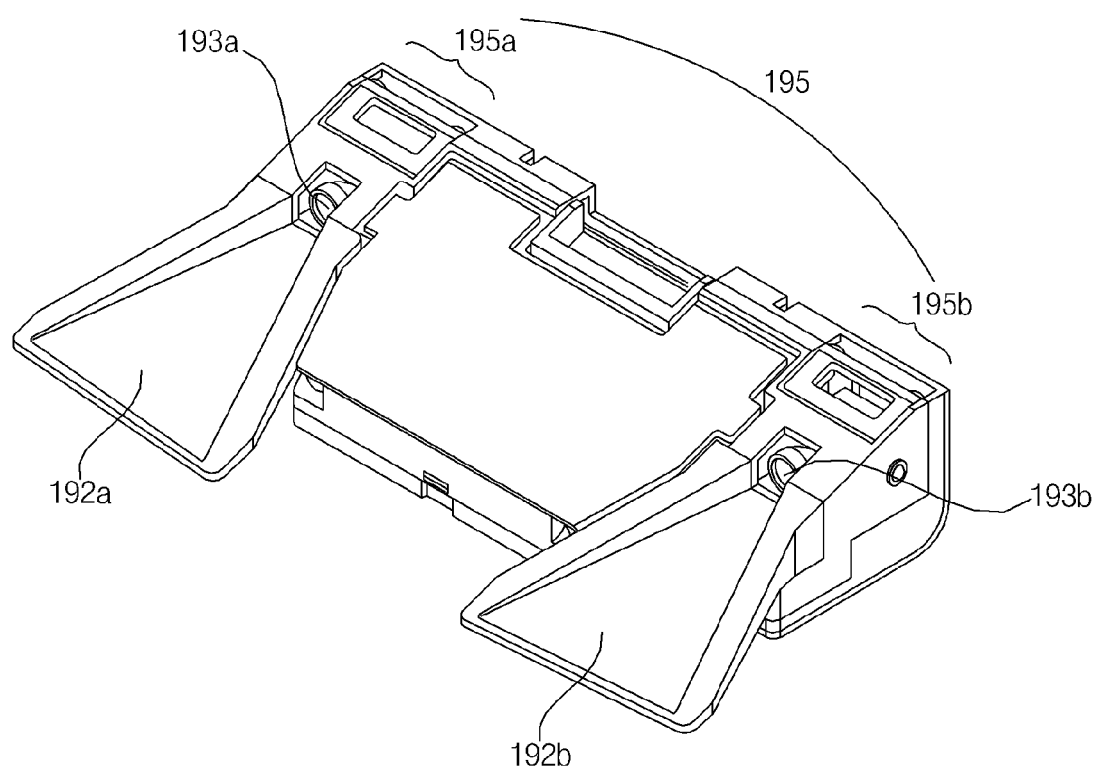
FIG. 2 is a view showing the external appearance of the stereo camera attached to the vehicle shown in FIG. 1.

FIG. 2 is a view showing the external appearance of the stereo camera attached to the vehicle shown in FIG. 1.

Referring to FIG. 2, the stereo camera 195 may include a first camera 195a having a first lens 193a and a second camera 195b having a second lens 193b.

In addition, the stereo camera 195 may further include a first light shield unit 192a to shield light falling incident upon the first lens 193a and a second light shield unit 192b to shield light falling incident upon the second lens 193b.

The stereo camera 195 shown in FIG. 2 may be detachably attached to a ceiling or a front windshield glass of the vehicle 200.

The driver assistance apparatus 100 (see FIG. 3) having the stereo camera 195 may acquire stereo images for a view ahead of the vehicle from the stereo camera 195, detect a disparity based on the stereo images, detect an object for at least one of the stereo images based on disparity information, and continuously track motion of the object after detection of the object.

Figure 3A:
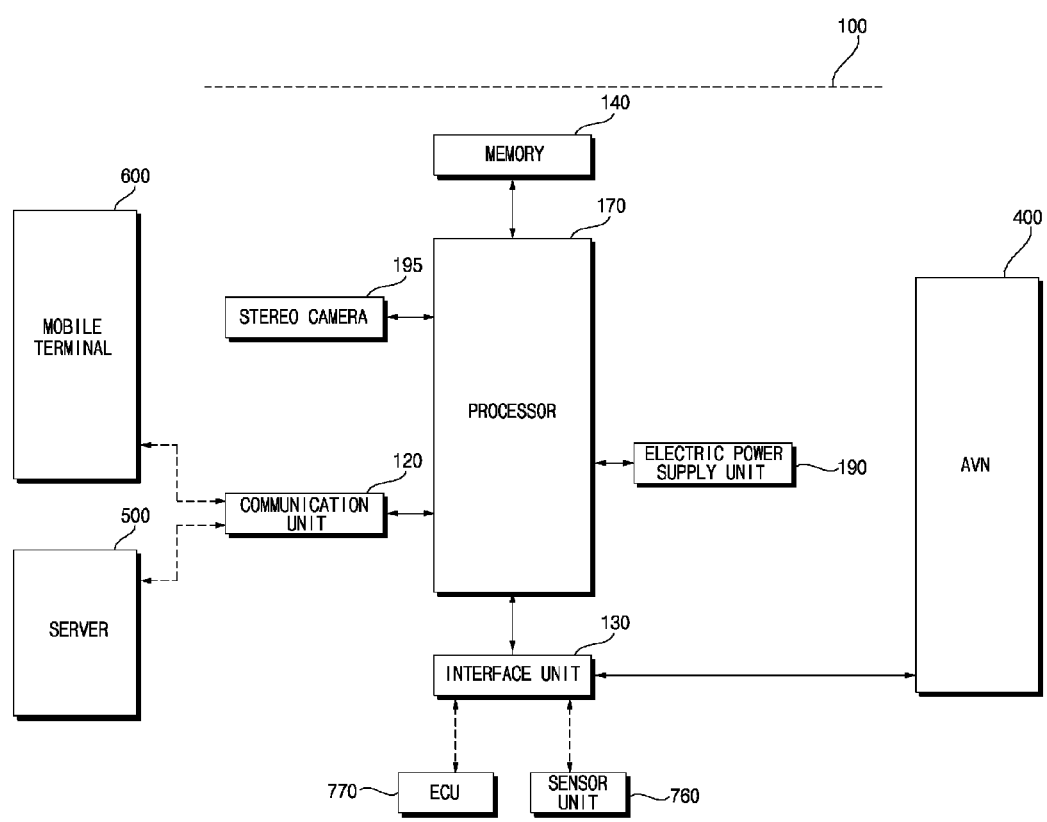
FIGS. 3A and 3B are internal block diagrams showing various examples of a driver assistance apparatus according to an embodiment of the present disclosure.
Figure 3B:
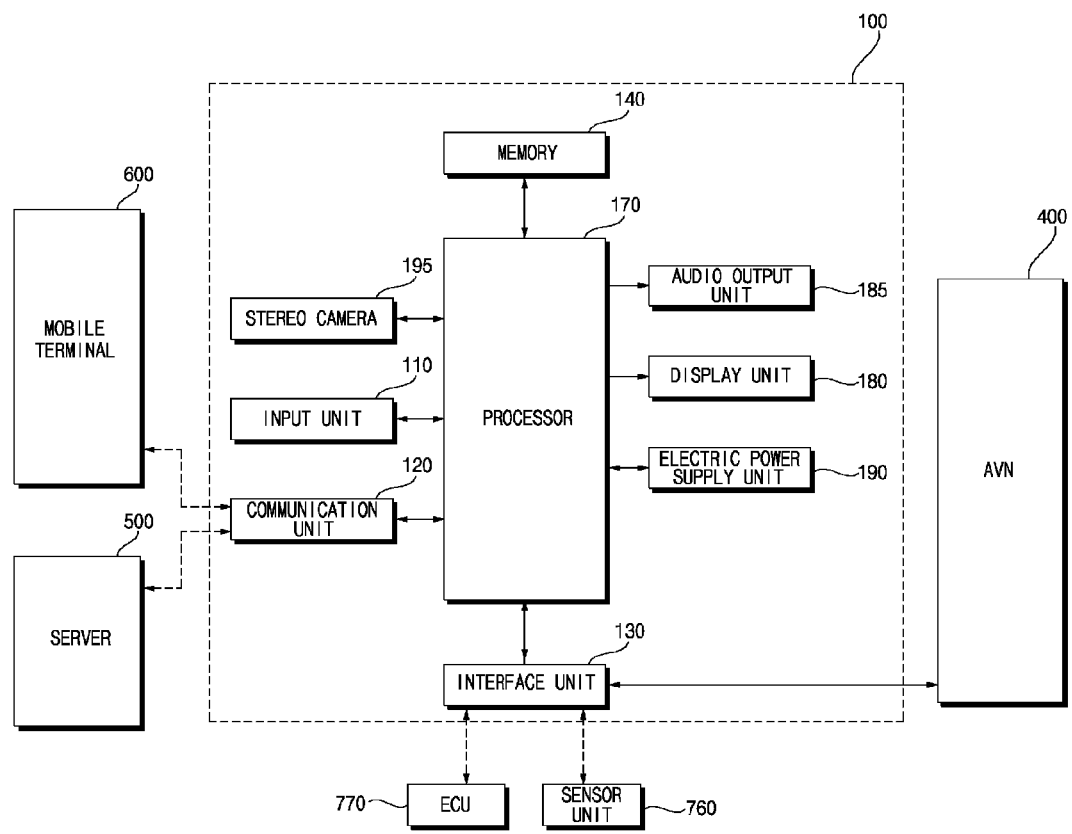

FIGS. 3A and 3B are internal block diagrams showing various examples of a driver assistance apparatus according to an embodiment of the present disclosure.

Referring to FIGS. 3A and 3B, a driver assistance apparatus 100 may signal-process stereo images received from the stereo camera 195 based on computer vision to generate vehicle-related information. Computer vision includes methods for acquiring, processing, analyzing, and understanding images and, in general, high-dimensional data from the real world in order to produce numerical or symbolic information, e.g., in the forms of decisions to duplicate the abilities of human vision by electronically perceiving and understanding an image. This image understanding can be seen as the disentangling of symbolic information from image data using models constructed with the aid of geometry, physics, statistics, and learning theory. The image data can take many forms, such as video sequences, views from multiple cameras, or multi-dimensional data. The vehicle-related information may include vehicle control information for direct control of the vehicle or driver assistance information for driving guidance provided to a driver.

Referring first to FIG. 3A, the driver assistance apparatus 100 may include a communication unit 120, an interface unit 130, a memory 140, a processor 170, an electric power supply unit 190, and a stereo camera 195.

The communication unit 120 may exchange data with a mobile terminal 600 or a server 500 in a wireless fashion. In particular, the communication unit 120 may exchange data with a mobile terminal of the driver in a wireless fashion. To this end, various wireless data communication protocols, such as Bluetooth, Wi-Fi, Wi-Fi Direct, and APiX, may be used.

The communication unit 120 may receive weather information and road traffic state information, such as Transport Protocol Expert Group (TPEG) information, from the mobile terminal 600 or the server 500. On the other hand, the communication unit 120 may transmit real-time traffic information acquired by the driver assistance apparatus 100 based on stereo images to the mobile terminal 600 or the server 500.

When a user gets into the vehicle, a mobile terminal 600 of the user may pair with the driver assistance apparatus 100 automatically or by the user executing a pairing application.

The interface unit 130 may receive vehicle-related data or transmit a signal processed or generated by the processor 170 to the outside. To this end, the interface unit 130 may perform data communication with an electronic control unit (ECU) 770, an audio and video navigation (AVN) apparatus 400, and a sensor unit 760 in the vehicle in a wired communication fashion or a wireless communication fashion.

The interface unit 130 may receive map information related to vehicle travel through data communication with the AVN apparatus 400.

On the other hand, the interface unit 130 may receive sensor information from the ECU 770 and the sensor unit 760.

The sensor information may include at least one of vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information.

The sensor information may be acquired by a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, or an in-vehicle humidity sensor. The position module may include a global positioning system (GPS) module to receive GPS information.

Of the above-specified sensor information, the vehicle heading information, the vehicle position information, the vehicle angle information, the vehicle speed information, and the vehicle tilt information, which are related to vehicle travel, may be referred to as vehicle travel information.

The memory 140 may store various data related to overall operation of the driver assistance apparatus 100, such as programs for processing or control of the processor 170.

An audio interface unit (not shown) may convert an electric signal received from the processor 170 into an audio signal and outputs the audio signal. To this end, the audio output unit (not shown) may include a speaker. The audio interface unit (not shown) may output a sound corresponding to an operation of an input unit (not shown), e.g., a button.

An audio input unit (not shown) may receive a user's voice. To this end, the audio input unit (not shown) may include a microphone. The received voice may be converted into an electric signal, which may be transmitted to the processor 170.

The processor 170 controls overall operation of each unit in the driver assistance apparatus 100.

In particular, the processor 170 performs signal processing based on computer vision. Consequently, the processor 170 may acquire stereo images for the view ahead of the vehicle from the stereo camera 195, calculate the disparity for the view ahead of the vehicle based on the stereo images, detect an object for at least one of the stereo images based on calculated disparity information, and continuously track motion of the object after detection of the object.

In particular, during detection of the object, the processor 170 may perform lane marker detection (LD), adjacent vehicle detection (VD), pedestrian detection (PD), bright spot detection (BD), traffic sign recognition (TSR), and road surface detection.

In addition, the processor 170 may calculate the distance to the detected adjacent vehicle, speed of the detected adjacent vehicle, and a difference in speed with the detected adjacent vehicle.

Meanwhile, the processor 170 may receive weather information and road traffic state information, such as TPEG information, through the communication unit 120.

On the other hand, the processor 170 may acquire, in real time, traffic-around-vehicle state information acquired by the driver assistance apparatus 100 based on stereo images.

Meanwhile, the processor 170 may receive map information from the AVN apparatus 400 through the interface unit 130.

On the other hand, the processor 170 may receive sensor information from the ECU 770 or the sensor unit 760 through the interface unit 130. The sensor information may include at least one of vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, and in-vehicle humidity information.

The electric power supply unit 190 may supply electric power to the respective components under control of the processor 170. In particular, electric power from an in-vehicle battery may be supplied to the electric power supply unit 190.

The stereo camera 195 may include a plurality of cameras. In the following description, it is assumed that the stereo camera 195 includes two cameras as previously described with reference to FIG. 2.

The stereo camera 195 may be detachably attached to a ceiling or a front windshield glass of the vehicle 200. The stereo camera 195 may include a first camera 195*a* having a first lens 193*a* and a second camera 195*b* having a second lens 193*b*.

In addition, the stereo camera 195 may further include a first light shield unit 192*a* to shield light incident upon the first lens 193*a* and a second light shield unit 192*b* to shield light incident upon the second lens 193*b*.

Referring now to FIG. 3B, the driver assistance apparatus 100 of FIG. 3B may further include an input unit 110, a display unit 180, and an audio output unit 185 as compared with the driver assistance apparatus 100 of FIG. 3A. Hereinafter, a description will be given of only the input unit 110, the display unit 180, and the audio output unit 185.

The user input unit 110 may include a plurality of buttons or a touchscreen attached to the driver assistance apparatus 100, specifically to the stereo camera 195. The driver assistance apparatus 100 may be powered on through the buttons or the touchscreen such that the driver assistance apparatus 100 is operated. In addition, various input operations may be performed through the input unit 110.

The audio output unit 185 outputs a sound based on an audio signal processed by the processor 170 to the outside. To this end, the audio output unit 185 may include at least one speaker.

The display unit 180 may display an image related to an operation of the driver assistance apparatus. In order to display such an image, the display unit 180 may include a cluster or a heads up display (HUD) provided at the inside front of the vehicle. In a case in which the display unit 180 is the HUD, the display unit 180 may include a projection module to project an image on the front windshield glass of the vehicle 200.

Although the sensor unit 760 is shown as being provided outside the driver assistance apparatus 100 in FIGS. 3A and 3B, the sensor unit 760 may be provided in the driver assistance apparatus 100. In this case, sensed information may be directly transmitted to the processor 170 not through the interface unit 130.

Figure 4A:
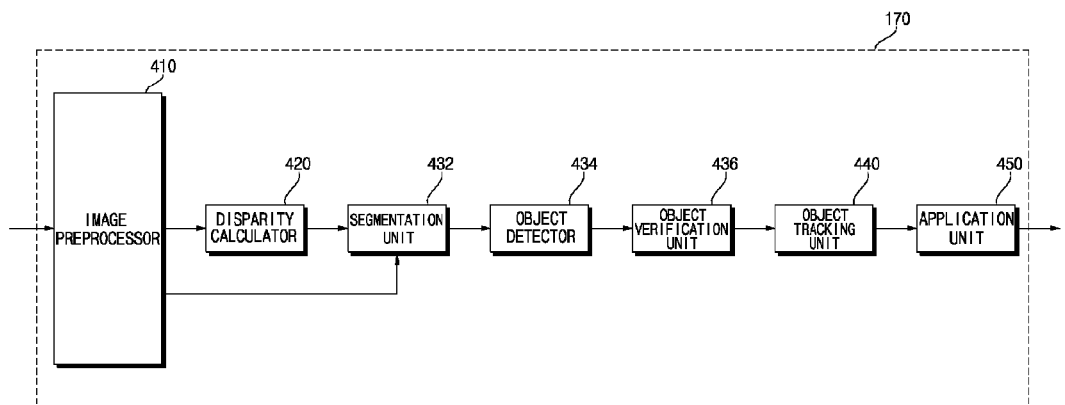
FIGS. 4A and 4B are internal block diagrams showing various examples of a processor shown in FIGS. 3A and 3B.
Figure 4B:
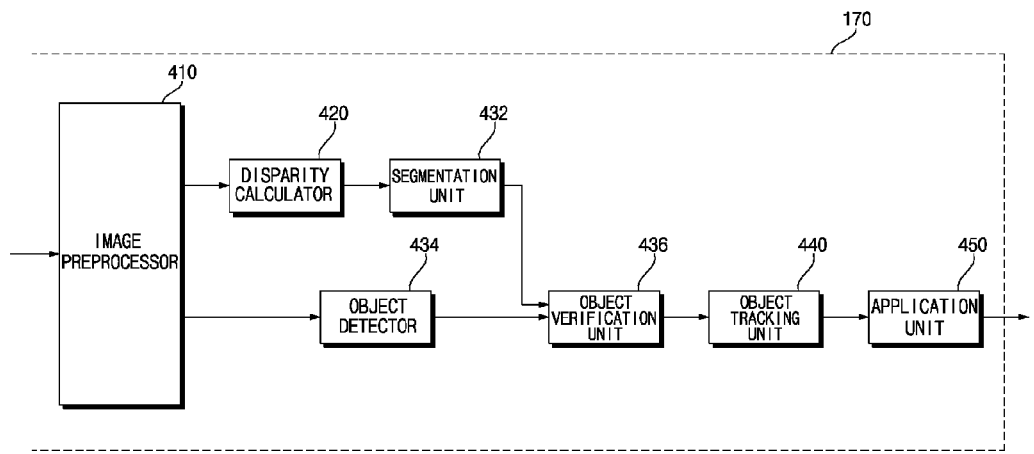

FIGS. 4A and 4B are internal block diagrams showing various examples of the processor shown in FIGS. 3A and 3B and FIGS. 5A and 5B are reference views illustrating operations of the processors shown in FIGS. 4A and 4B.

Referring first to FIG. 4A, which is an internal block diagram showing an example of the processor 170, the processor 170 of the driver assistance apparatus 100 may include an image preprocessor 410, a disparity calculator 420, a segmentation unit 432, an object detector 434, an object verification unit 436, an object tracking unit 440, and an application unit 450.

The image preprocessor 410 receives stereo images from the stereo camera 195 and preprocesses the received stereo images.

Specifically, the image preprocessor 410 may perform noise reduction, rectification, calibration, color enhancement, color space conversion (CSC), interpolation, and camera gain control for the stereo images. As a result, the image preprocessor 410 may acquire stereo images more vivid than the stereo images photographed by the stereo camera 195.

The disparity calculator 420 may receive the stereo images signal-processed by the image preprocessor 410, perform stereo matching for the received stereo images, and acquire a disparity map based on the stereo matching. That is, the disparity calculator 420 may acquire disparity information of stereo images for a view ahead of the vehicle.

The stereo matching may be performed on a per pixel basis or a per predetermined block basis of the stereo images. Meanwhile, the disparity information may be included in a map showing binocular parallax information as values.

The segmentation unit 432 may perform segmentation and clustering for at least one of the stereo images based on the disparity information from the disparity calculator 420.

Specifically, the segmentation unit 432 may segment at least one of the stereo images into a background and a foreground based on the disparity information.

For example, a region having a predetermined value or less of the disparity information in the disparity map may be calculated as a background and the region may be excluded. As a result, a foreground may be relatively separated from the stereo image.

In another example, a region having a predetermined value or more of the disparity information in the disparity map may be calculated as a foreground and the region may be extracted. As a result, the foreground may be separated from the stereo image.

As described above, the stereo image is segmented into the background and the foreground based on the disparity information extracted based on the stereo image. Therefore, signal processing speed and signal processing amount may be reduced during detection of an object.

The object detector 434 may detect an object based on the image segment from the segmentation unit 432. That is, the object detector 434 may detect an object for at least one of the stereo images based on the disparity information. For example, the object detector 434 may detect an object from a foreground separated from the stereo image by the image segment. Subsequently, the object verification unit 436 classifies and verifies the separated object.

To this end, the object verification unit 436 may use a recognition method using a neural network, a support vector machine (SVM) method, a recognition method based on AdaBoost using a Haar-like feature, or a histograms of oriented gradients (HOG) method or another appropriate technique.

On the other hand, the object verification unit 436 may compare the detected object with objects stored in the memory 140 to verify the detected object.

For example, the object verification unit 436 may verify an adjacent vehicle, a lane marker, a road surface, a traffic sign, a dangerous zone, a tunnel, or the like. located around the vehicle.

The object tracking unit 440 tracks the verified object. For example, the object tracking unit 440 may verify an object in stereo images which are sequentially acquired, calculate motion or a motion vector of the verified object, and track movement of the object based on the calculated motion or the calculated motion vector. Consequently, the object tracking unit 440 may track an adjacent vehicle, a lane marker, a road surface, a traffic sign, a dangerous zone, a tunnel, or the like, located around the vehicle.

Subsequently, the application unit 450 may calculate a risk of the vehicle 200 based on various objects, such as adjacent vehicle, a lane marker, a road surface, and a traffic sign, located around the vehicle. In addition, the application unit 450 may calculate a possibility of a rear-end collision with a preceding vehicle, slip of the vehicle, or the like.

In addition, the application unit 450 may output a message informing a user of the following information as driver assistance information based on the calculated risk, the calculated possibility of the rear-end collision, or the calculated slip of the vehicle. Alternatively, the application unit 450 may generate a control signal for attitude control or travel control of the vehicle 200 as vehicle control information.

FIG. 4B is an internal block diagram showing another example of the processor 170.

Referring to FIG. 4B, the processor 170 of FIG. 4B is substantially similar in construction to the processor 170 of FIG. 4A except that a signal processing sequence of the processor 170 of FIG. 4B is different from that of the processor 170 of FIG. 4A. Hereinafter, a description will be given of only the difference between the processor 170 of FIG. 4B and the processor 170 of FIG. 4A.

The object detector 434 may receive stereo images and detect an object for at least one of the stereo images. Unlike FIG. 4A, the object detector 434 may not detect an object for an image segmented based on disparity information but directly detect an object from a stereo image.

Subsequently, the object verification unit 436 may classify and verify the detected and separated object based on the image segment from the segmentation unit 432 and the object detected by the object detector 434.

To this end, the object verification unit 436 may use a recognition method using a neural network, an SVM method, a recognition method based on AdaBoost using a Haar-like feature, or a HOG method.

Figure 5A:
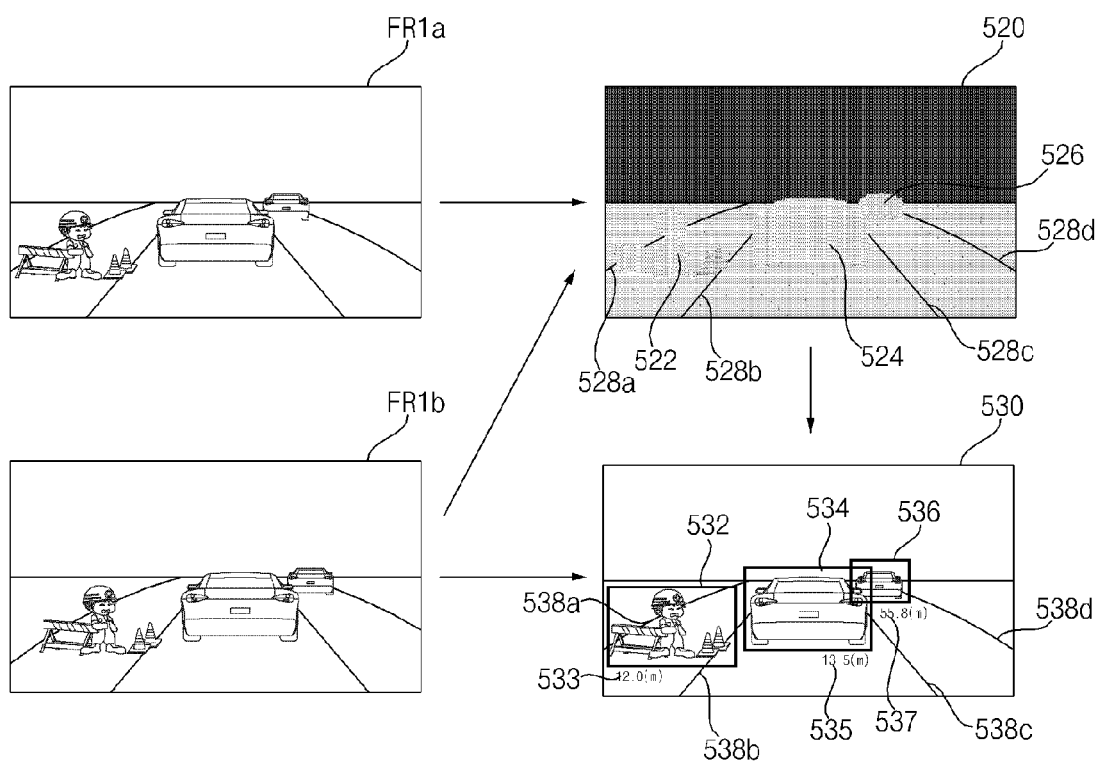
FIGS. 5A and 5B are reference views illustrating operations of the processors shown in FIGS. 4A and 4B.
Figure 5B:
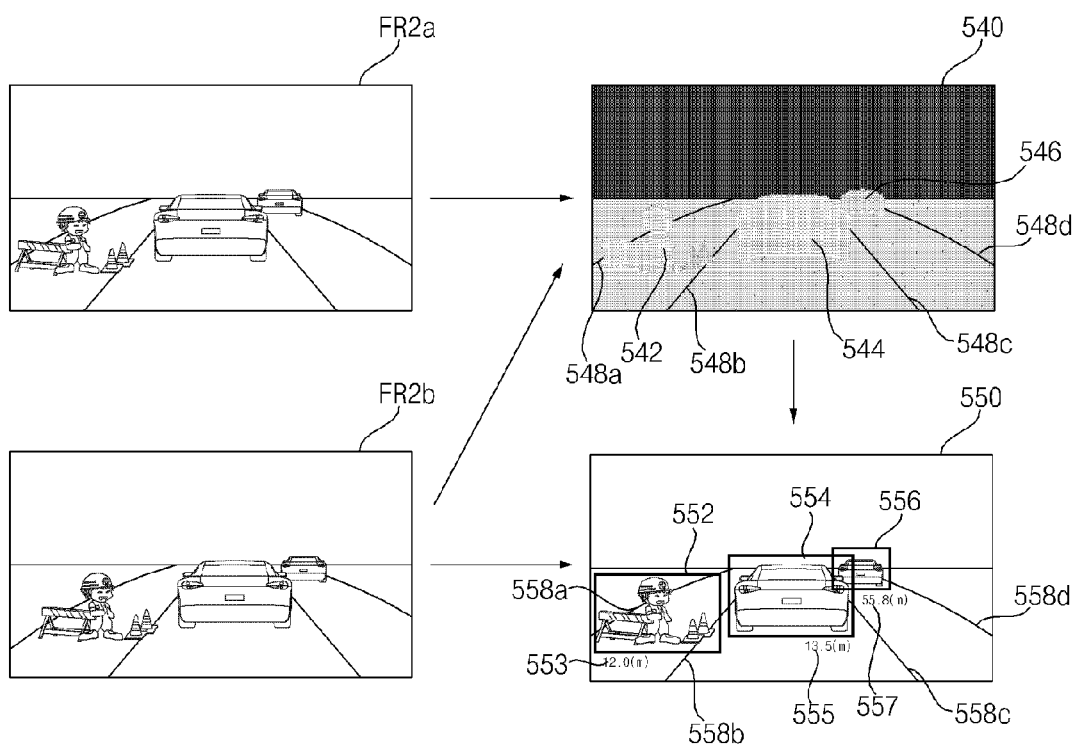

FIGS. 5A and 5B are reference views illustrating an operation of the processor 170 shown in FIG. 4A based on stereo images acquired from first and second frame periods.

Referring first to FIG. 5A, the stereo camera 195 acquires stereo images during the first frame period.

The disparity calculator 420 of the processor 170 receives stereo images FR1a and FR1b signal-processed by the image preprocessor 410 and performs stereo matching for the received stereo images FR1a and FR1b to acquire a disparity map 520.

The disparity map 520 shows a disparity between the stereo images FR1a and FR1b as a level. When a disparity level is high, the distance to the vehicle may be calculated as being short. When a disparity level is low, on the other hand, the distance to the vehicle may be calculated as being long.

Meanwhile, in a case in which the disparity map is displayed, the disparity map may be displayed with higher brightness when the disparity level is higher and the disparity map may be displayed with lower brightness when the disparity level is lower.

By way of example, FIG. 5A shows that in the disparity map 520, first to fourth lane markers 528a, 528b, 528c, and 528d have their own disparity levels and a construction zone 522, a first preceding vehicle 524, and a second preceding vehicle 526 have their own disparity levels.

The segmentation unit 432, the object detector 434, and the object verification unit 436 respectively perform segmentation, object detection, and object verification for at least one of the stereo images FR1a or FR1b based on the disparity map 520. Object detection and object verification for the second stereo image FR1b are performed using the disparity map 520. That is, object detection and object verification for first to fourth lane markers 538a, 538b, 538c, and 538d, a construction zone 532, a first preceding vehicle 534, and a second preceding vehicle 536 in an image 530 may be performed.

Referring now to FIG. 5B, the stereo camera 195 acquires stereo images during the second frame period. The disparity calculator 420 of the processor 170 receives stereo images FR2a and FR2b signal-processed by the image preprocessor 410 and performs stereo matching for the received stereo images FR2a and FR2b to acquire a disparity map 540.

In the disparity map 540, first to fourth lane markers 548a, 548b, 548c, and 548d have their own disparity levels and a construction zone 542, a first preceding vehicle 544, and a second preceding vehicle 546 have their own disparity levels.

The segmentation unit 432, the object detector 434, and the object verification unit 436 respectively perform segmentation, object detection, and object verification for at least one of the stereo images FR2a and FR2b based on the disparity map 540. Object detection and object verification for the second stereo image FR2b are performed using the disparity map 540. That is, object detection and object verification for first to fourth lane markers 558a, 558b, 558c, and 558d, a construction zone 552, a first preceding vehicle 554, and a second preceding vehicle 556 in an image 550 may be performed.

Meanwhile, the object tracking unit 440 may track the objects verified based on comparison between FIGS. 5A and 5B. Specifically, the object tracking unit 440 may track movement of the objects verified in FIGS. 5A and 5B based on motion or motion vectors of the objects. Consequently, the object tracking unit 440 may track the lane markers, the construction zone, the first preceding vehicle, and the second preceding vehicle located around the vehicle.

Figure 6A:
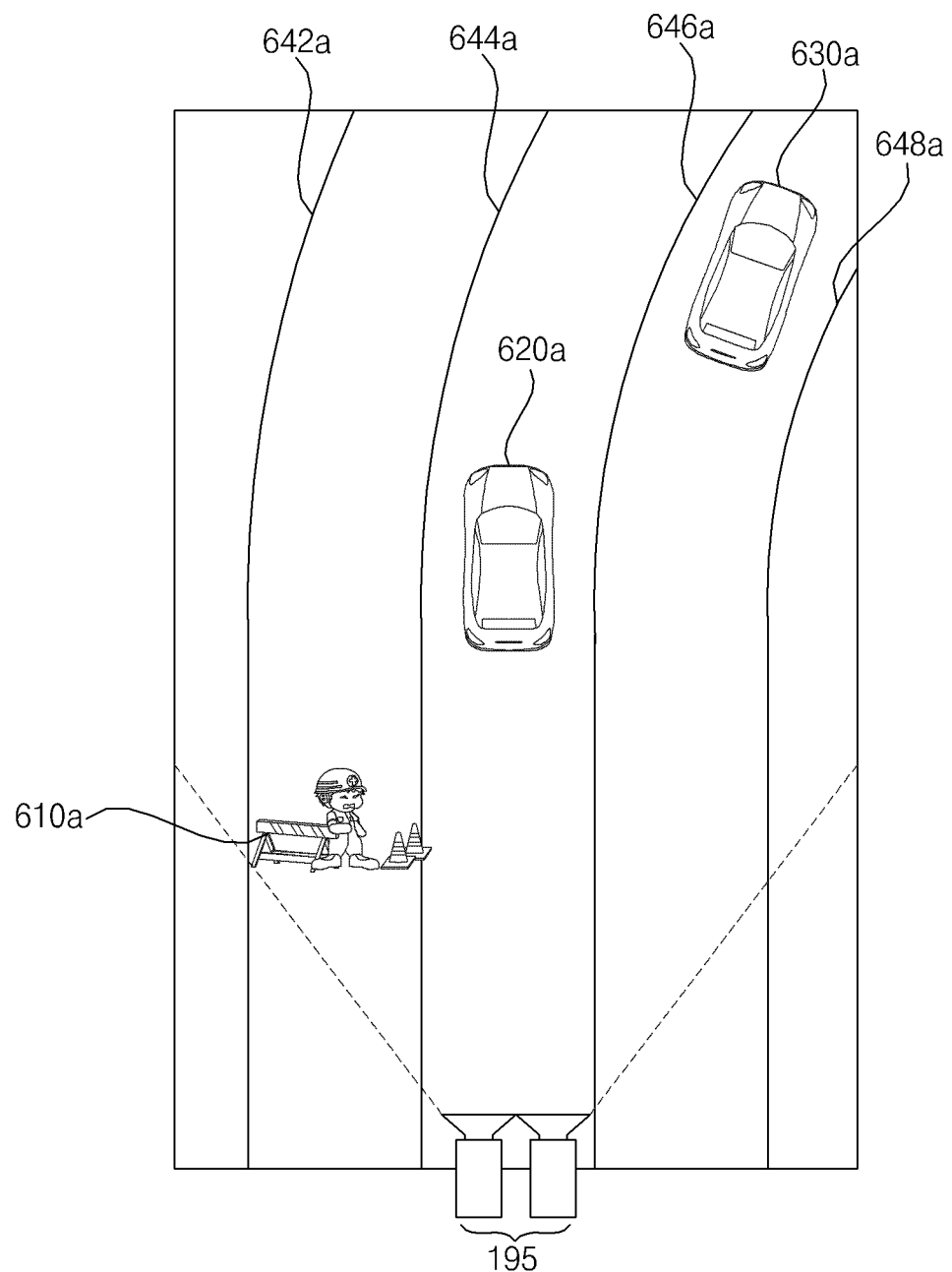
FIGS. 6A and 6B are reference views illustrating operations of the driver assistance apparatuses shown in FIGS. 3A and 3B.
Figure 6B:
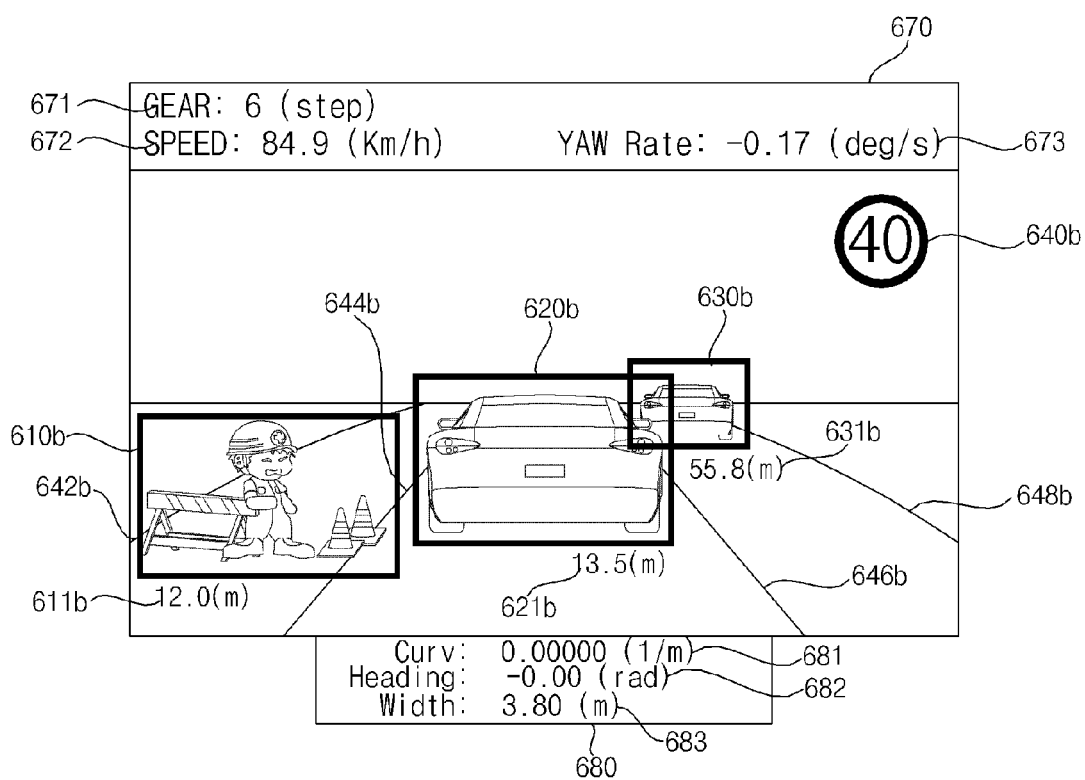

FIGS. 6A and 6B are reference views illustrating an operation of the driver assistance apparatus shown in FIG. 3.

By way of example, FIG. 6A shows a state ahead of the vehicle photographed by the stereo camera 195 provided in the vehicle. In particular, the state ahead of the vehicle is displayed as a bird eye view. A first lane marker 642a, a second lane marker 644a, a third lane marker 646a, and a fourth lane marker 648a are arranged from the left side to the right side. A construction zone 610a is located between the first lane marker 642a and the second lane marker 644a. A first preceding vehicle 620a is located between the second lane marker 644a and the third lane marker 646a. A second preceding vehicle 630a is located between the third lane marker 646a and the fourth lane marker 648a.

By way of example, FIG. 6B shows a state ahead of the vehicle acquired by the driver assistance apparatus together with various kinds of information. In particular, an image as shown in FIG. 6B may be displayed on the display unit 180 of the driver assistance apparatus or on the AVN apparatus 400. Information is displayed based on images photographed by the stereo camera 195 unlike FIG. 6A.

A first lane marker 642b, a second lane marker 644b, a third lane marker 646b, and a fourth lane marker 648b are arranged from the left side to the right side. A construction zone 610b is located between the first lane marker 642b and the second lane marker 644b. A first preceding vehicle 620b is located between the second lane marker 644b and the third lane marker 646b. A second preceding vehicle 630b is located between the third lane marker 646b and the fourth lane marker 648b.

The driver assistance apparatus 100 may perform signal processing based on stereo images photographed by the stereo camera 195 to verify objects for the construction zone 610b, the first preceding vehicle 620b, and the second preceding vehicle 630b. In addition, the driver assistance apparatus 100 may verify the first lane marker 642b, the second lane marker 644b, the third lane marker 646b, and the fourth lane marker 648b.

Meanwhile, FIG. 6B shows, by way of example, that, in order to indicate that the objects for the construction zone 610b, the first preceding vehicle 620b, and the second preceding vehicle 630b have been verified, borders of the objects are highlighted.

On the other hand, the driver assistance apparatus 100 may calculate distance information for the construction zone 610b, the first preceding vehicle 620b, and the second preceding vehicle 630*b* based at least in part on stereo images photographed by the stereo camera 195.

FIG. 6B shows, by way of example, that calculated first distance information 611*b*, calculated second distance information 621*b*, and calculated third distance information 631*b* respectively corresponding to the construction zone 610*b*, the first preceding vehicle 620*b*, and the second preceding vehicle 630*b* may be displayed.

Meanwhile, the driver assistance apparatus 100 may receive sensor information for the vehicle from the ECU 770 or the sensor unit 760. In particular, the driver assistance apparatus 100 may receive and display vehicle speed information, gear information, yaw rate information indicating speed at which a rotational angle (yaw angle) of the vehicle is changed, and vehicle angle information.

FIG. 6B shows that vehicle speed information 672, gear information 671, and yaw rate information 673 may be displayed at a portion 670 above the image ahead of the vehicle and vehicle angle information 682 is displayed at a portion 680 under the image ahead of the vehicle. However, various examples may be further provided and fall within the scope of the present disclosure. In addition, vehicle width information 683 and road curvature information 681 may be displayed together with the vehicle angle information 682.

On the other hand, the driver assistance apparatus 100 may receive for a road on which the vehicle is traveling through the communication unit 120 or the interface unit 130. The speed limit information 640*b* may also be displayed.

The driver assistance apparatus 100 may display various kinds of information shown in FIG. 6B through the display unit 180. Alternatively, the driver assistance apparatus 100 may store various kinds of information without additionally displaying the information. In addition, the driver assistance apparatus 100 may utilize the information in various applications.

Figure 7:
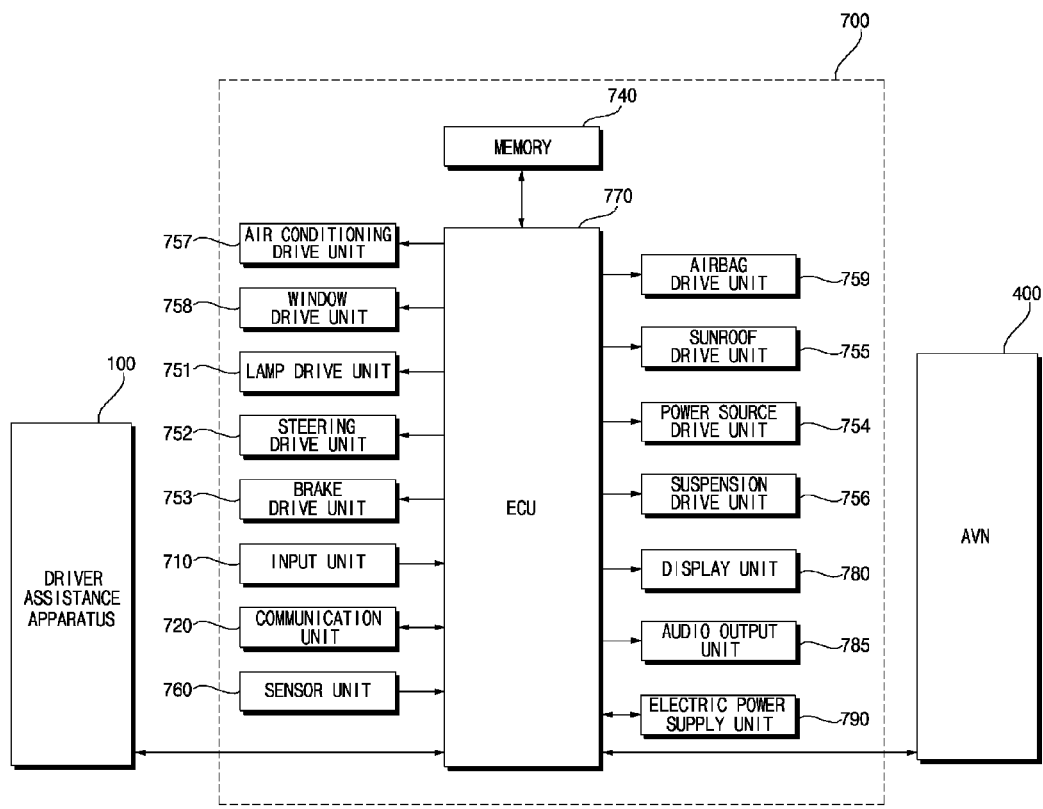
FIG. 7 is an internal block diagram showing an example of an electronic control apparatus in the vehicle shown in FIG. 1.

FIG. 7 is an internal block diagram showing an example of an electronic control apparatus in the vehicle shown in FIG. 1.

Referring to FIG. 7, the vehicle 200 may include an electronic control apparatus 700 for vehicle control. The electronic control apparatus 700 may exchange data with the driver assistance apparatus 100 and the AVN apparatus 400.

The electronic control apparatus 700 may include an input unit 710, a communication unit 720, a memory 740, a lamp drive unit 751, a steering drive unit 752, a brake drive unit 753, a power source drive unit 754, a sunroof drive unit 755, a suspension drive unit 756, an air conditioning drive unit 757, a window drive unit 758, an airbag drive unit 759, a sensor unit 760, an ECU 770, a display unit 780, an audio output unit 785, and an electric power supply unit 790.

The user input unit 710 may include a plurality of buttons or a touchscreen provided in the vehicle 200. Various input operations may be performed through the buttons or the touchscreen.

In one example, the communication unit 720 may exchange data with the mobile terminal 600 or the server 500 in a wireless fashion. In particular, the communication unit 720 may exchange data with a mobile terminal of the driver in a wireless fashion. To this end, various wireless data communication protocols, such as Bluetooth, Wi-Fi, Wi-Fi Direct, and APiX, may be used.

The communication unit 720 may receive weather information and road traffic state information, such as TPEG information, from the mobile terminal 600 or the server 500.

When a user gets into the vehicle, a mobile terminal 600 of the user may pair with the electronic control apparatus 700 automatically or by the user executing an application.

The memory 740 may store various data for overall operation of the electronic control apparatus 700, such as programs for processing or control of the ECU 770.

The lamp drive unit 751 may control turn on/turn off of lamps provided inside and outside the vehicle. In addition, the lamp drive unit 751 may control intensity, direction, or the like. of light emitted from each lamp. For example, the lamp drive unit 751 may control a direction indicating lamp, a brake lamp, or the like.

The steering drive unit 752 may electronically control a steering apparatus in the vehicle 200. Consequently, the steering drive unit 752 may change a heading of the vehicle. The brake drive unit 753 may electronically control a brake apparatus in the vehicle 200. For example, the brake drive unit 753 may control an operation of a brake mounted at each wheel to reduce speed of the vehicle 200. In another example, the brake drive unit 753 may differently control operations of brakes mounted at left wheels and right wheels to adjust the heading of the vehicle 200 to the left or the right. The power source drive unit 754 may electronically control a power source in the vehicle 200. For example, in a case in which the power source is an engine using fossil fuel, the power source drive unit 754 may electronically control the engine. Consequently, the power source drive unit 754 may control output torque of the engine.

In another example, in a case in which the power source is an electric motor, the power source drive unit 754 may control the motor. Consequently, the power source drive unit 754 may control rotational speed and torque of the motor.

The sunroof drive unit 755 may electronically control a sunroof apparatus in the vehicle 200. For example, the sunroof drive unit 755 may control a sunroof to be opened or closed.

The suspension drive unit 756 may electronically control a suspension apparatus in the vehicle 200. For example, in a case in which a road surface is uneven, the suspension drive unit 756 may control the suspension apparatus to reduce vibration of the vehicle 200.

The air conditioning drive unit 757 may electronically control an air conditioner in the vehicle 200. For example, in a case in which the internal temperature of the vehicle is high, the air conditioning drive unit 757 may control the air conditioner to supply cool air into the vehicle.

The window drive unit 758 may electronically control a window apparatus in the vehicle 200. For example, the window drive unit 758 may control left and right side windows of the vehicle to be opened or closed.

The airbag drive unit 759 may electronically control an airbag apparatus in the vehicle 200. For example, the airbag drive unit 759 may control an airbag to deploy in a dangerous situation.

The sensor unit 760 senses a signal related to travel of the vehicle 200. To this end, the sensor unit 760 may include a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, an in-vehicle humidity sensor, or other appropriate sensor.

Consequently, the sensor unit 760 may acquire a sensing signal for vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, in-vehicle humidity information, and the like.

In addition, the sensor unit 760 may further include an engine speed sensor, an air flow sensor (AFS), an intake air temperature sensor (ATS), a water temperature sensor (WTS), a throttle position sensor (TPS), a top dead center (TDC) sensor, and a crank angle sensor (CAS). The ECU 770 may control overall operation of each unit in the electronic control apparatus 700.

The ECU 770 may perform a specific operation based on an input through the input unit 710, receive and transmit a signal sensed by the sensor unit 760 to the driver assistance apparatus 100, receive map information from the AVN apparatus 400, or control operations of the respective drive units 751, 752, 753, 754, and 756.

In addition, the ECU 770 may receive weather information and road traffic state information, such as TPEG information, from the communication unit 720. The display unit 780 may display an image related to an operation of the driver assistance apparatus. In order to display such an image, the display unit 780 may include a cluster or a HUD provided at the inside front of the vehicle. In a case in which the display unit 180 is the HUD, the display unit 180 may include a projection module to project an image on the front windshield glass of the vehicle 200. Meanwhile, the display unit 780 may include a touchscreen to allow input by tapping on the screen.

The audio output unit 785 converts an electric signal received from the ECU 770 into an audio signal and outputs the audio signal. To this end, the audio output unit 785 may include a speaker. The audio output unit 785 may output a sound corresponding to an operation of the input unit 710, e.g., a button.

The electric power supply unit 790 may supply electric power to the respective components under control of the ECU 770. In particular, electric power from an in-vehicle battery may be supplied to the electric power supply unit 790.

Figure 8:
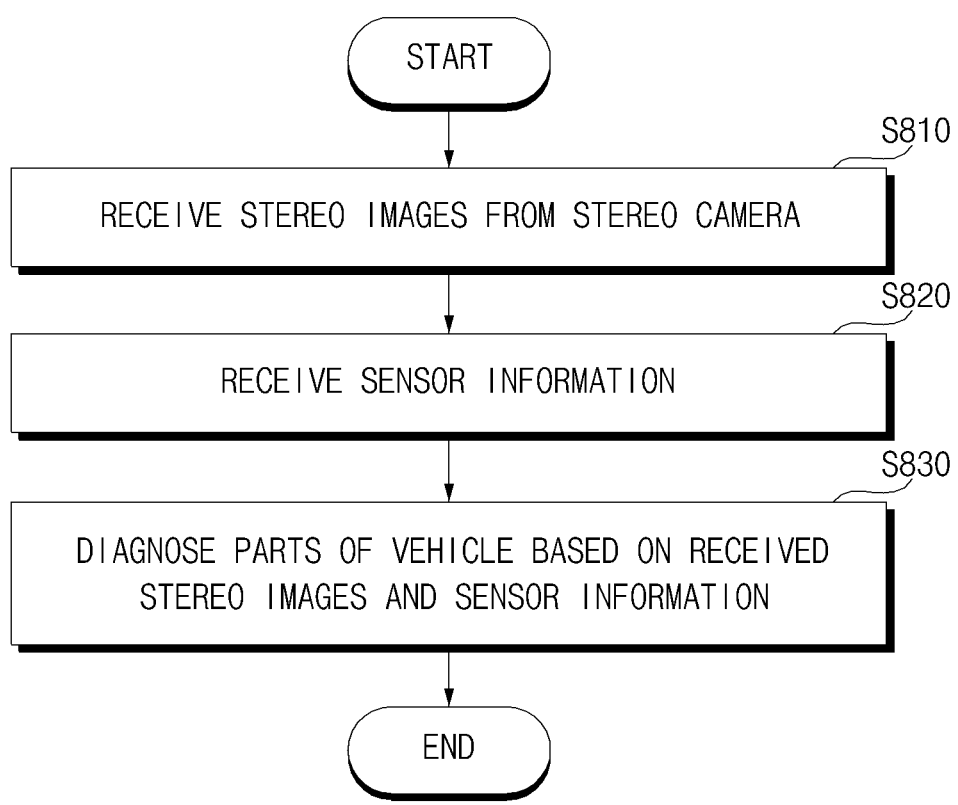
FIG. 8 is a flowchart showing an operation method of the driver assistance apparatus according to the embodiment of the present disclosure.

FIG. 8 is a flowchart that shows the operation of the driver assistance apparatus according to the embodiment of the present disclosure and FIGS. 9 to 16 are reference views illustrating the operation method of the driver assistance apparatus shown in FIG. 8.

Referring to FIG. 8, the processor 170 of the driver assistance apparatus 100 receives stereo images from the stereo camera in step S810. Subsequently, the processor 170 of the driver assistance apparatus 100 calculates vehicle surrounding information based on the received stereo images.

As previously described with reference to FIG. 2, the processor 170 of the driver assistance apparatus 100 receives a first image through the first camera 195a of the stereo camera 195 disposed in the vehicle and a second image through the second camera 195b of the stereo camera 195. Since the first camera 195a and the second camera 195b are spaced apart from each other, there is a disparity between the first image and the second image.

The processor 170 of the driver assistance apparatus 100 calculates the disparity between the first image and the second image and performs segmentation, object detection, and object verification for at least one of the first and second images using the calculated disparity information.

Subsequently, the processor 170 of the driver assistance apparatus 100 tracks the verified object, such as a preceding vehicle, a lane marker, a structure, or a road surface. Subsequently, the processor 170 of the driver assistance apparatus 100 may acquire distance information or heading information, such as heading of the vehicle, for the preceding vehicle located ahead of the vehicle. In addition, the processor 170 of the driver assistance apparatus 100 may acquire speed information, relative speed information, or the like for the preceding vehicle located ahead of the vehicle.

The vehicle surrounding information based on the stereo images may include a lane marker, a structure, and an adjacent vehicle. In addition, the vehicle surrounding information based on the stereo images may further include information regarding the distance to the adjacent vehicle and speed information of the adjacent vehicle.

Subsequently, the processor 170 receives sensor information related to a travel state of the vehicle in step S820. In particular, the processor 170 receives vehicle travel state information sensed by the sensor unit 760. The sensed vehicle travel state information may include speed information and vehicle heading information from a speed sensor and a steering angle sensor and vehicle heading information from a steering wheel sensor. The processor 170 may calculate speed of the vehicle, heading of the vehicle, or the like, based on the received vehicle travel state information.

Subsequently, the processor 170 diagnoses various vehicle parts based on the stereo images received from the stereo camera 195 and the vehicle travel state information sensed by the sensor unit 760 in step S830.

The vehicle parts may include a steering apparatus, a tire, a wheel alignment, a brake apparatus, a head lamp, and the like. For example, the processor 170 may calculate vehicle heading information based on the stereo images, detect vehicle heading information from the steering wheel sensor of the sensor unit 760, and determine whether the steering apparatus or the tire is abnormal based on the calculated vehicle heading information and the detected vehicle heading information.

On the other hand, the processor 170 may detect a lane marker based on the stereo images, calculate the distance between the detected lane marker and the vehicle, detect speed information and vehicle heading information from the speed sensor and the steering angle sensor of the sensor unit 760, calculate the distance between the lane marker and the vehicle based on the detected speed information and the detected vehicle heading information, and determine that at least one of the steering apparatus, the tire, and the wheel alignment is abnormal in a case in which a difference between the distance between the lane marker and the vehicle calculated based on the stereo images and the distance between the lane marker and the vehicle calculated based on the sensor information is equal to or greater than a predetermined value.

In addition, in a case in which, in a state in which the steering wheel is positioned within a predetermined range for forward travel of the vehicle, the vehicle heading information detected based on the stereo images received from the stereo camera 195 does not correspond to the predetermined range, the processor 170 may determine that the wheel alignment is abnormal.

On the other hand, the processor 170 may detect a preceding vehicle and the distance to the preceding vehicle based on the stereo images. In a case in which a predicted distance to the preceding vehicle is greater by a predetermined distance than the distance to the preceding vehicle detected based on the stereo images when the brake apparatus is driven or in a case in which a braking distance when the brake apparatus is driven is greater by a predetermined distance than a braking distance calculated based on the stereo images, the processor 170 may determine that the brake apparatus is abnormal.

In addition, the processor 170 may detect a traffic sign or a road surface during travel of the vehicle in the nighttime based on the stereo images and determine that the head lamp is abnormal in a case in which brightness data for the detected traffic sign or the detected road surface are equal to or less than a predetermined level. The processor 170 may control abnormality information based on an abnormality determination to be output through at least one of the display unit 180 and the audio output unit 185.

On the other hand, in a case in which the number of times that the abnormality determination is equal to or greater than a predetermined value, the processor 170 may control a message indicating that vehicle part replacement is needed to be output through at least one of the display unit 180 and the audio output unit 185 or control an emergency lamp in the vehicle to be turned on.

In addition, the processor 170 may control the communication unit 120 to transmit the abnormality information based on the abnormality determination or to transmit the message indicating that part replacement is needed to the mobile terminal 600 or the server 500.

The vehicle part diagnosis may be periodically performed after starting of the vehicle. Alternatively, the vehicle part diagnosis may be performed at the time of starting of the vehicle, at the time of temporarily stopping the vehicle during travel of the vehicle, when external impact applied to the vehicle is equal to or greater than a predetermined level, or the like. Otherwise, the vehicle part diagnosis may be performed through a user input.

In addition, the processor 170 of the driver assistance apparatus 100 may predict a heading of the vehicle based on the stereo images and the vehicle travel information.

The processor 170 of the driver assistance apparatus 100 may estimate vehicle egomotion, i.e., an environmental displacement of the vehicle, based on the vehicle heading information or the vehicle angle information of the vehicle travel information and track a heading of the vehicle based on the estimated vehicle egomotion and the lane marker detected based on the stereo images. In addition, the processor 170 of the driver assistance apparatus 100 may predict a heading of the vehicle based on the tracked heading of the vehicle.

Figure 9:
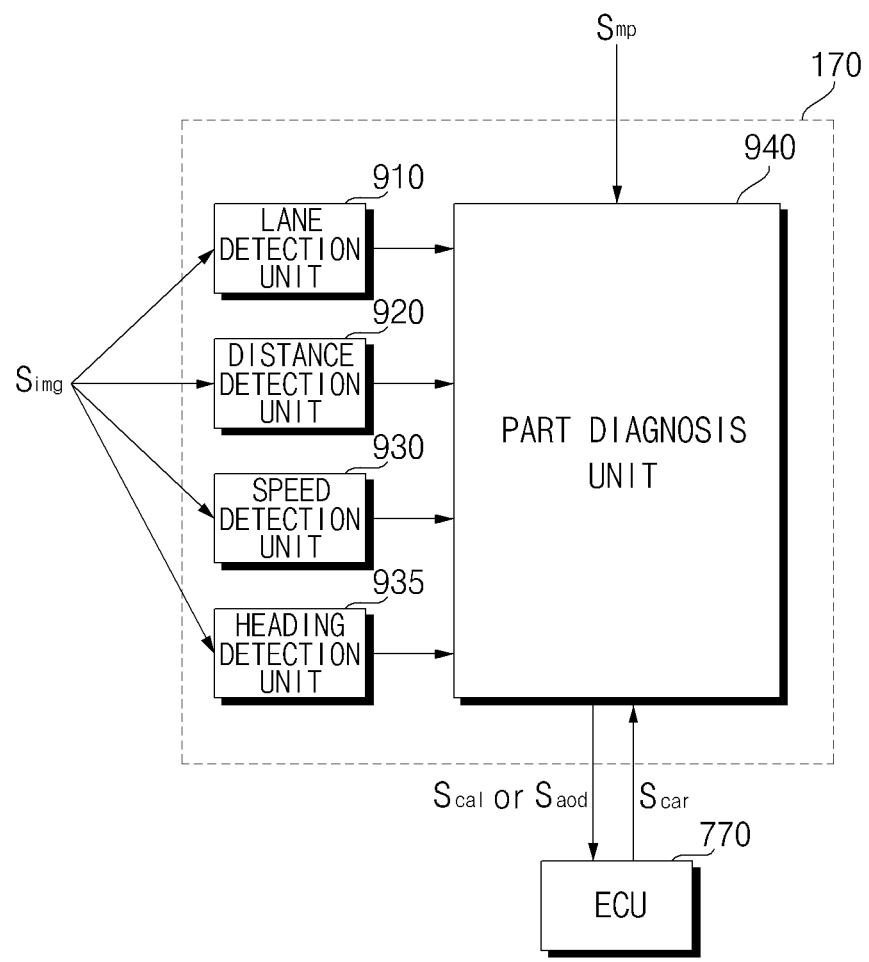
FIGS. 9 to 16 are reference views illustrating the operation method of the driver assistance apparatus shown in FIG. 8.

FIG. 9 is an internal block diagram showing an example of the processor for part diagnosis. The processor 170 of the driver assistance apparatus 100 may include a lane marker detection unit 910, a distance detection unit 920, a speed detection unit 930, a heading detection unit 935, and a vehicle part diagnosis unit 940.

The processor 170 of the driver assistance apparatus 100 may receive stereo images Simg from the stereo camera 195, receive map information Smp from the AVN apparatus 400 through the interface unit 130, and receive sensor information Scar from the ECU 770 or the sensor unit 760.

The sensor information Scar includes vehicle travel state information. The vehicle travel state information may include vehicle heading information, vehicle position information (GPS information), vehicle angle information, vehicle speed information, vehicle tilt information, lateral entrance information, and backward movement information.

The lane marker detection unit 910 may perform lane marker detection based on the stereo images Simg received from the stereo camera 195. Specifically, the lane marker detection unit 910 may detect a lane marker ahead of the vehicle based on a disparity between the stereo images Simg.

In a similar manner, the distance detection unit 920 and the speed detection unit 930 may detect the distance and speed of a preceding vehicle based on the stereo images Simg received from the stereo camera 195.

In addition, the heading detection unit 935 may detect heading of the vehicle based on the stereo images Simg received from the stereo camera 195. For example, the heading detection unit 935 may detect a heading of the vehicle based on a sequential position change of the detected lane marker. Specifically, in a case in which a lane marker located at the right side in each stereo image Simg sequentially moves to the left side during travel on a straight road, the heading detection unit 935 may detect that the vehicle heads in the right direction.

The vehicle part diagnosis unit 940 may diagnose parts of the vehicle based on at least one of the detected lane marker information, the information regarding the distance to the adjacent vehicle, the speed information, the vehicle heading information, the vehicle travel information Scar, and the map information Smp.

In particular, the vehicle part diagnosis unit 940 may compare at least one of the lane marker information, the information regarding the distance to the adjacent vehicle, the speed information, and the vehicle heading information detected based on the stereo images with various kinds of information based on the sensor information sensed by the sensor unit 760 and determine that a related part of the vehicle is abnormal in a case in which a difference therebetween is equal to or greater than a predetermined value.

For example, the vehicle part diagnosis unit 940 may calculate vehicle heading information based on the stereo images, detect vehicle heading information from the steering wheel sensor of the sensor unit 760, and determine whether the steering apparatus or one or more tires is abnormal based on the calculated vehicle heading information and the detected vehicle heading information.

On the other hand, the part diagnosis unit 940 may detect a lane marker based on the stereo images, calculate the distance between the detected lane marker and the vehicle, detect speed information and vehicle heading information from the speed sensor and the steering angle sensor of the sensor unit 760, calculate the distance between the lane marker and the vehicle based on the detected speed information and the detected vehicle heading information, and determine that at least one of the steering apparatus, one or moreties, or the wheel alignment is abnormal in a case in which a difference between the distance between the lane marker and the vehicle calculated based on the stereo images and the distance between the lane marker and the vehicle calculated based on the sensor information is equal to or greater than a predetermined value.

Meanwhile, in a case in which, in a state in which the steering wheel is positioned within a predetermined range for forward travel of the vehicle, the vehicle heading information detected based on the stereo images received from the stereo camera 195 does not correspond to the predetermined range, the vehicle part diagnosis unit 940 may determine that the wheel alignment is abnormal.

On the other hand, the vehicle part diagnosis unit 940 may detect a preceding vehicle and the distance to the preceding vehicle based on the stereo images. In a case in which a predicted distance to the preceding vehicle is greater by a predetermined distance than the distance to the preceding vehicle detected based on the stereo images when the brake apparatus is driven or in a case in which a braking distance when the brake apparatus is driven is greater by a predetermined distance than a braking distance calculated based on the stereo images, the vehicle part diagnosis unit 940 may determine that the brake apparatus is abnormal.

Meanwhile, the vehicle part diagnosis unit 940 may detect a traffic sign or a road surface during travel of the vehicle in the nighttime based on the stereo images and determine that the head lamp is abnormal in a case in which brightness data for the detected traffic sign or the detected road surface are equal to or less than a predetermined level.

FIGS. 10A, 10B, 10C, 11A, 11B, and 11C show various examples of vehicle part diagnosis.

Figure 10A:
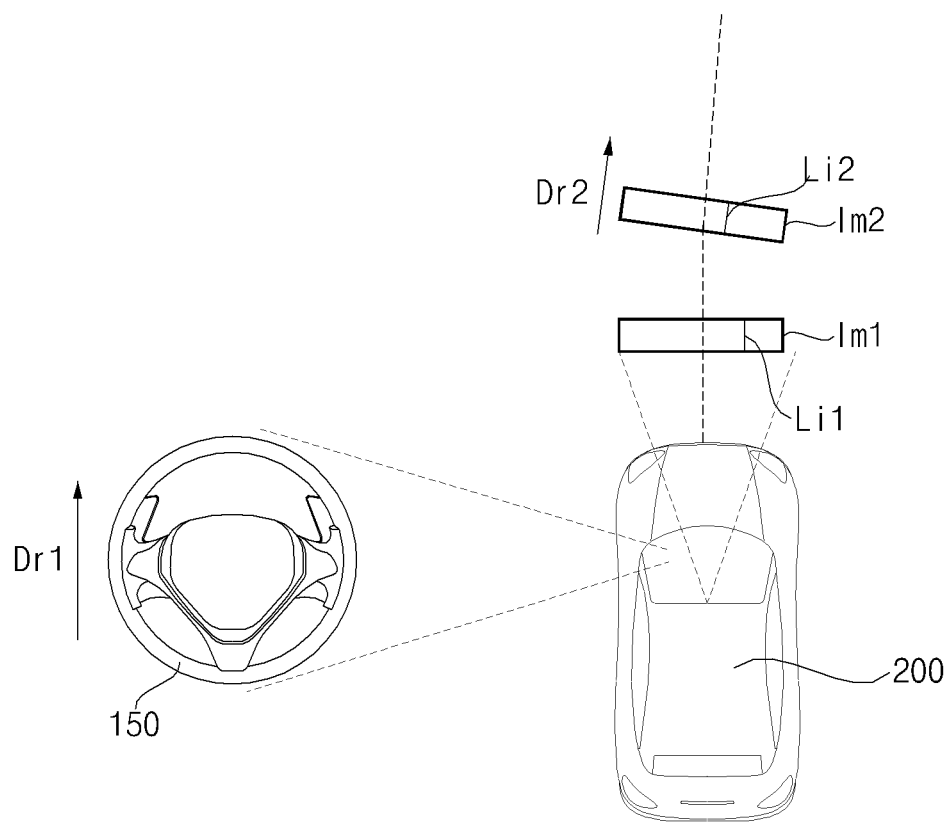

By way of example, FIG. 10A shows that lane markers Li1 and Li2 in images Im1 and Im2 photographed by the stereo camera 195 in a state in which the steering wheel 150 of the vehicle is positioned to steer the vehicle in a straight, forward direction Dr1 gradually moves from the right to the left.

The processor 170 may calculate the vehicle heading information Dr2 based on the sequentially acquired stereo images, detect vehicle heading information Dr1 from the steering wheel sensor of the sensor unit 760, and determine whether the steering apparatus, the wheel alignment, or one or more tires are abnormal based on the calculated vehicle heading information Dr2 and the detected vehicle heading information Dr1.

In a case in which the vehicle heading information Dr2 based on the sequentially acquired stereo images moves to the right as compared with the vehicle heading information Dr1 from the steering wheel sensor as shown in FIG. 10A, the processor may determine that the steering apparatus or the wheel alignment deviates to the right or air pressure of a right tire is low, for example.

Meanwhile, in a case in which, in a state in which the steering wheel is positioned within a predetermined range for forward travel of the vehicle, the vehicle heading information detected based on the stereo images received from the stereo camera 195 does not correspond to the predetermined range, the processor 170 may determine that the wheel alignment is abnormal, for example.

That is, in a case in which, in a state in which the vehicle heading information Dr1 from the steering wheel sensor is positioned within a predetermined range for a straight direction as shown in FIG. 10A, the vehicle heading information detected based on the stereo images received from the stereo camera 195 does not correspond to the predetermined range, the processor 170 may determine that the wheel alignment is abnormal.

Figure 10B:
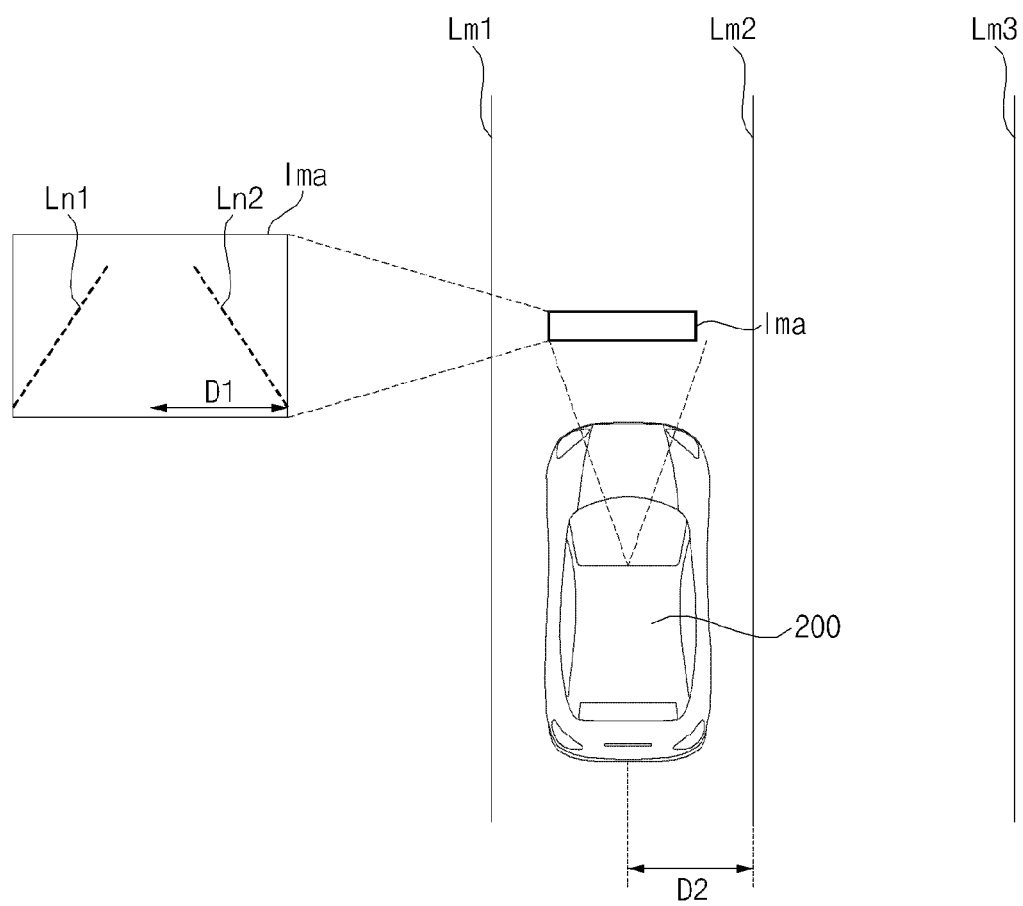

By way of example, FIG. 10B shows that information D1 regarding the distance to a lane marker is calculated based on an image Ima photographed by the stereo camera 195 and information Dr2 regarding the distance to the lane marker is calculated based on sensor information.

In a case in which the vehicle travels between opposite lane markers Lm1 and Lm2, the processor 170 may calculate information D1 regarding the distance to the actual lane marker Lm2 based on a lane marker Ln2 in the image Ima photographed by the stereo camera 195.

Meanwhile, the processor 170 may receive speed information and vehicle heading information from the sensor unit 760 when the vehicle starts to enter between the opposite lane markers Lm1 and Lm2. In addition, the processor 170 may calculate pre-stored information D1 regarding the distance to the opposite lane markers Lm1 and Lm2, speed information, and vehicle heading information in real time to calculate information D2 regarding the distance between the vehicle and the lane marker.

In a case in which a difference between the distance information D1 calculated based on the image and the distance information D2 calculated based on the sensor information is equal to or greater than a predetermined value, the processor 170 may determine that at least one of the steering apparatus, the wheel alignment, and one or more tires is abnormal.

For example, in a case in which the distance information D2 is less than the distance information D1, the processor 170 may determine that the vehicle heading information from the sensor unit is erroneous. Consequently, the processor 170 may determine that the steering apparatus or the wheel alignment deviates to the right or air pressure of the right tire is low.

In another example, in a case in which the distance information D2 is greater than the distance information D1, the processor 170 may determine that the vehicle heading information from the sensor unit is erroneous. Consequently, the processor 170 may determine that the steering apparatus or the wheel alignment deviates to the left or air pressure of a left tire is low.

Figure 11A:
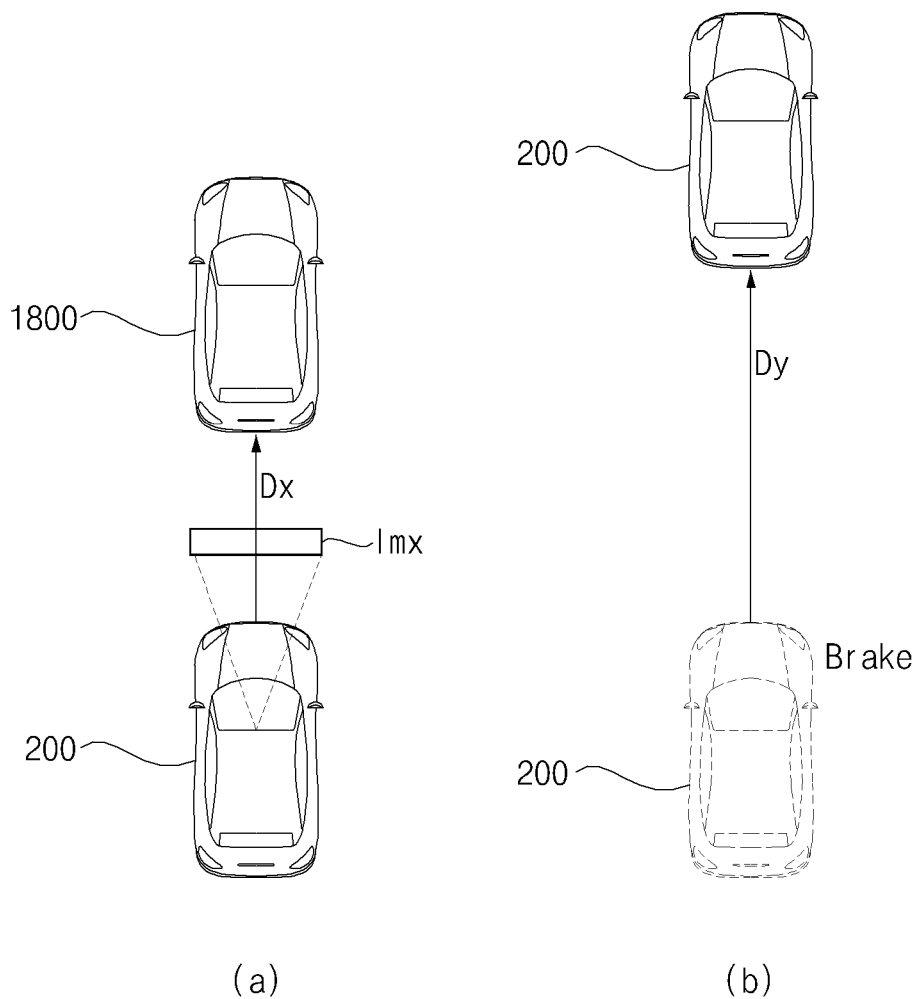

FIG. 11A is a reference view illustrating determination as to whether the brake apparatus is abnormal based on the calculation of the distance to a preceding vehicle and distance calculation when braking is actually performed.

FIG. 11A(a) shows, by way of example, that information Dx regarding the distance to a preceding vehicle 1800 is calculated based on an image Imx photographed by the stereo camera 195.

FIG. 11A(b) shows, by way of example, that the brake apparatus of the vehicle is actually driven.

In a case in which the brake apparatus is driven during travel of the vehicle, the processor 170 may calculate the distance from the time when the brake apparatus of the vehicle starts to operate to the time when the operation of the brake apparatus is stopped based on the image photographed by the stereo camera 195. For example, distance information Dx corresponding to the distance to the preceding vehicle as shown in FIG. 11A(a) may be calculated.

Meanwhile, the processor 170 may calculate a travel distance of the vehicle based on sensor information acquired by an odometer of the sensor unit 760. As a result, the processor 170 may calculate the distance from the time when the brake apparatus of the vehicle starts to operate to the time when the operation of the brake apparatus has been stopped based on the sensor information from the odometer. FIG. 11A(b) shows, by way of example, the calculated distance information Dy.

In a case in which a difference between the distance information Dx calculated based on the image and the distance information Dy calculated based on the sensor information is equal to or greater than a predetermined value, the processor 170 may determine that the brake apparatus is abnormal.

Figure 11B:
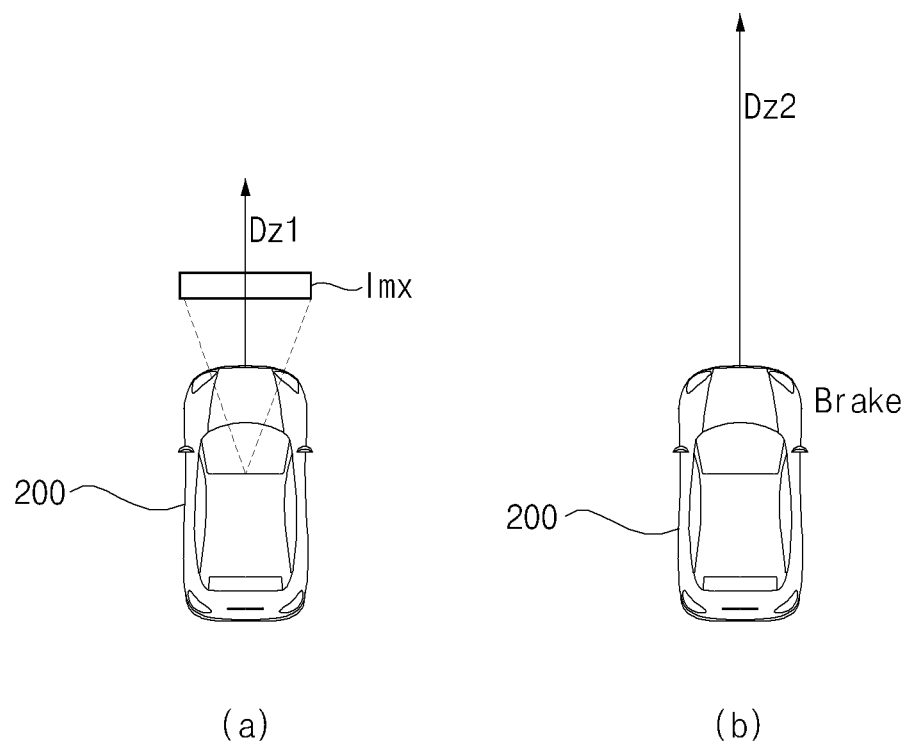

By way of example, FIG. 11B(a) shows a predicted braking distance Dz1 according to a brake operation based on a stereo image Imy during travel of the vehicle. FIG. 11B(b) shows an actual braking distance Dz2 according to an actual brake operation. The processor 170 may predict a braking distance Dz1 in response to a brake operation period. For example, the processor 170 may predict the braking distance Dz1 in consideration of current speed information, brake operation time information, or the like, of the vehicle. In addition, the processor 170 may compare the predicted braking distance Dz1 with the actual braking distance Dz2 according to the brake operation and determine that the brake apparatus is abnormal in a case in which a difference therebetween is equal to or greater than a predetermined value.

Figure 11C:
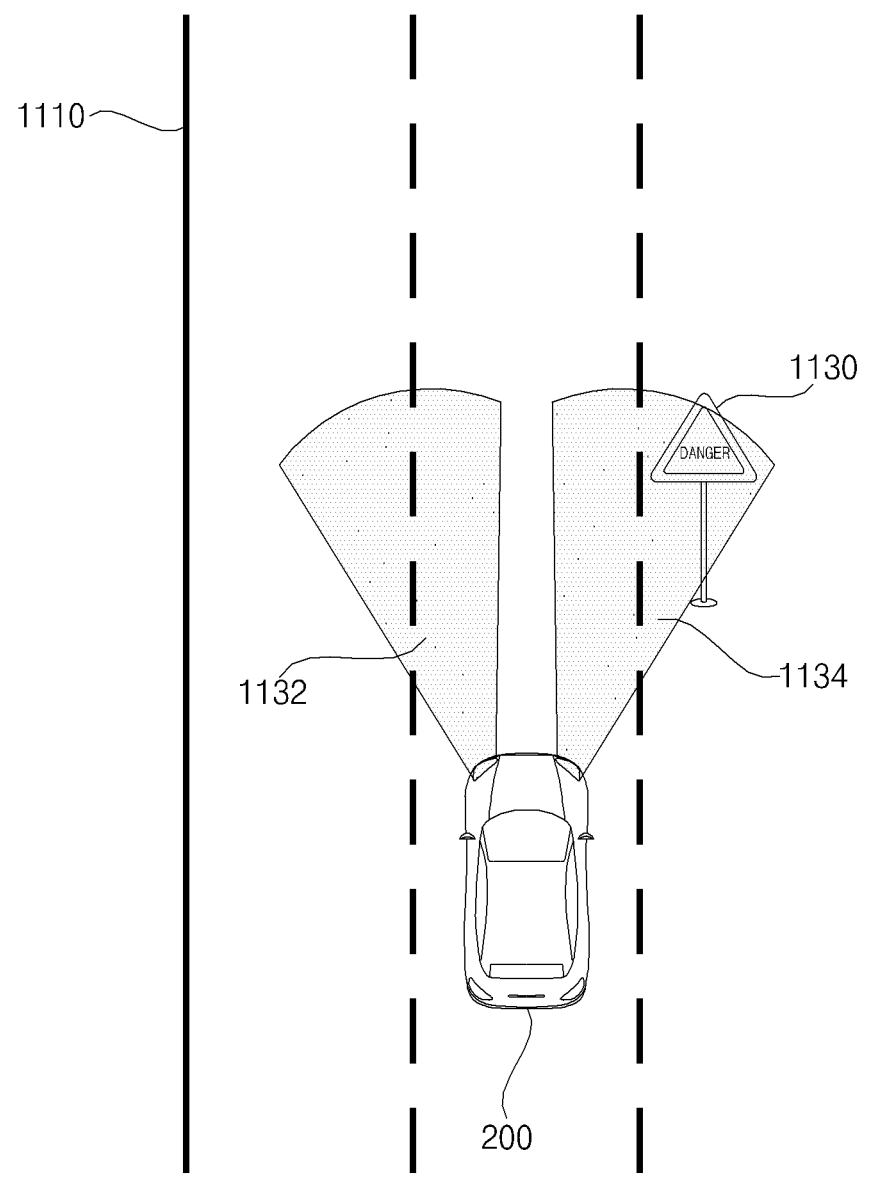

By way of example, FIG. 11C shows that head lamps are operated during travel of the vehicle 200 in the nighttime. Specifically, FIG. 11C shows head lamp output regions 1132 and 1134 of the left and right head lamps. The stereo camera 195 acquires a stereo image even during travel of the vehicle in the nighttime.

In a case in which a traffic sign 1130 appears during travel of the vehicle, the stereo camera 195 may acquire an image containing the traffic sign 1130 located in the head lamp output region 1134.

The processor 170 may detect the traffic sign during travel of the vehicle in the nighttime based on the stereo image and determine that the head lamps are abnormal in a case in which brightness data for the detected traffic sign are equal to or less than a predetermined level.

Meanwhile, information regarding radiation intensity of the lamps may be stored in the memory 140. The processor 170 may compare information regarding radiation intensity reflected by the traffic sign with the stored radiation intensity information and determine that the head lamps are abnormal in a case in which a difference therebetween is equal to or greater than a predetermined value.

On the other hand, the processor 170 may detect a road surface in addition to the traffic sign and determine that the head lamps are abnormal in a case in which brightness data for the detected road surface are equal to or less than a predetermined level.

Meanwhile, the processor 170 may control abnormality information based on an abnormality determination to be output through at least one of the display unit 180 and the audio output unit 185, which will hereinafter be described with reference to FIGS. 12 to 13C.

Figure 12:
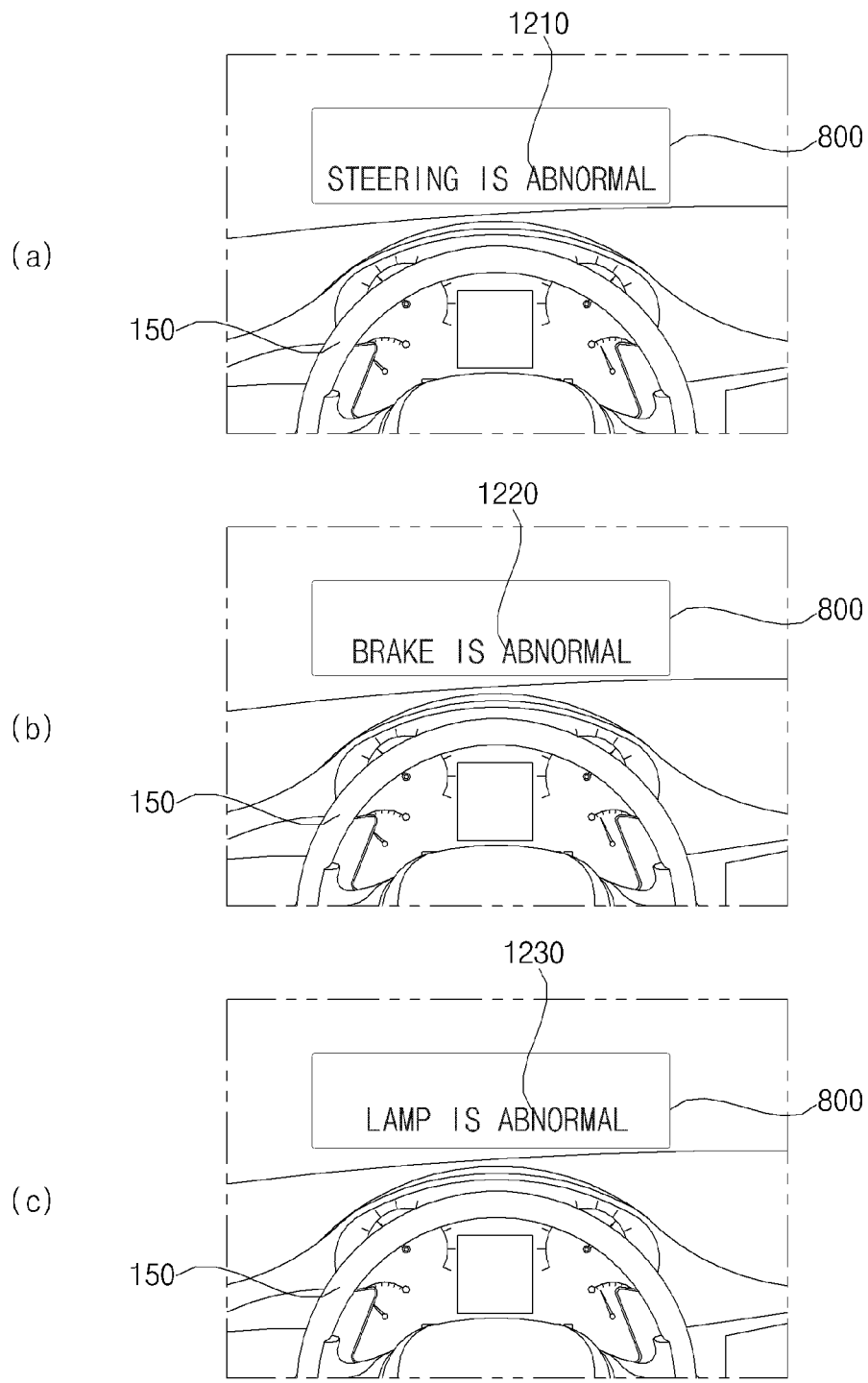

By way of example, FIG. 12(*a*) shows that the processor 170 outputs a message 1210 indicating a steering abnormality upon determining that steering of the vehicle is abnormal. In a case in which the display unit is a HUD, the message 1210 indicating steering abnormality may be output to an output region 800 on the front windshield glass of the vehicle. At this time, the message 1210 indicating steering abnormality may include a message indicating that the steering apparatus is abnormal, a message indicating that the wheel alignment is abnormal, or a message indicating that the tire is abnormal.

By way of example, FIG. 12(*b*) shows that the processor 170 outputs a message 1220 indicating a brake abnormality upon determining that the brake apparatus of the vehicle is abnormal. In FIG. 12(*b*), the message 1220 indicating brake abnormality is displayed in the output region 800.

By way of example, FIG. 12(*c*) shows that the processor 170 outputs a message 1230 indicating lamp abnormality upon determining that the lamps of the vehicle are abnormal. In FIG. 12(*c*), the message 1230 indicating lamp abnormality is displayed in the output region 800.

Figure 13A:
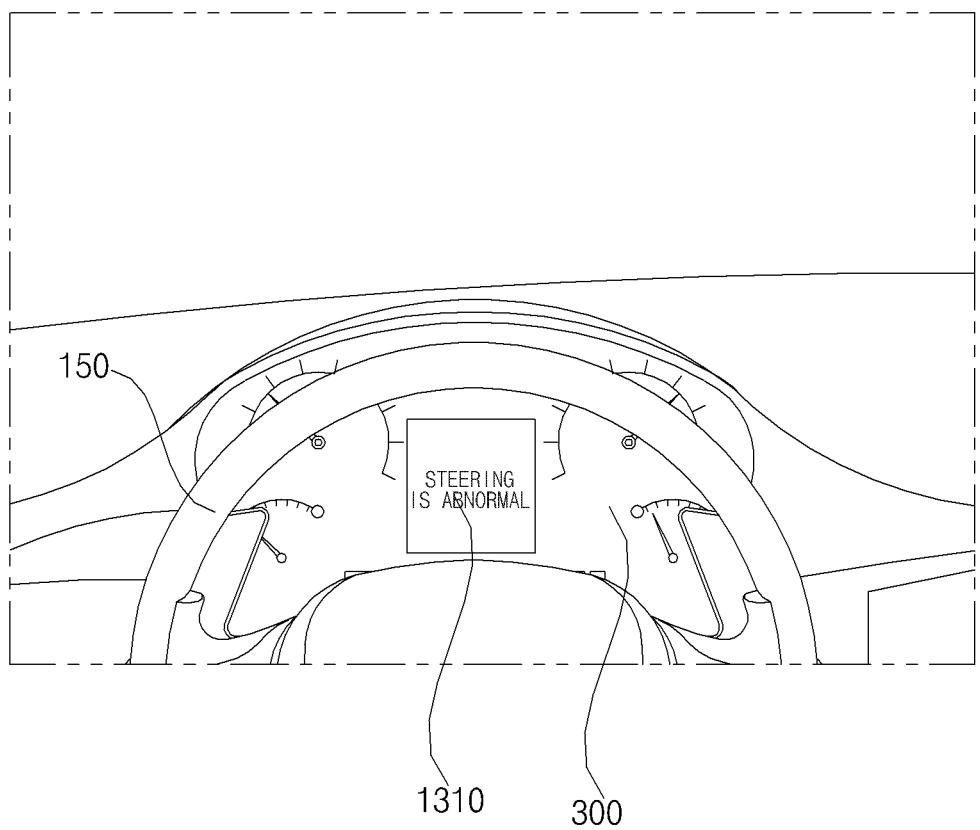
Figure 13B:
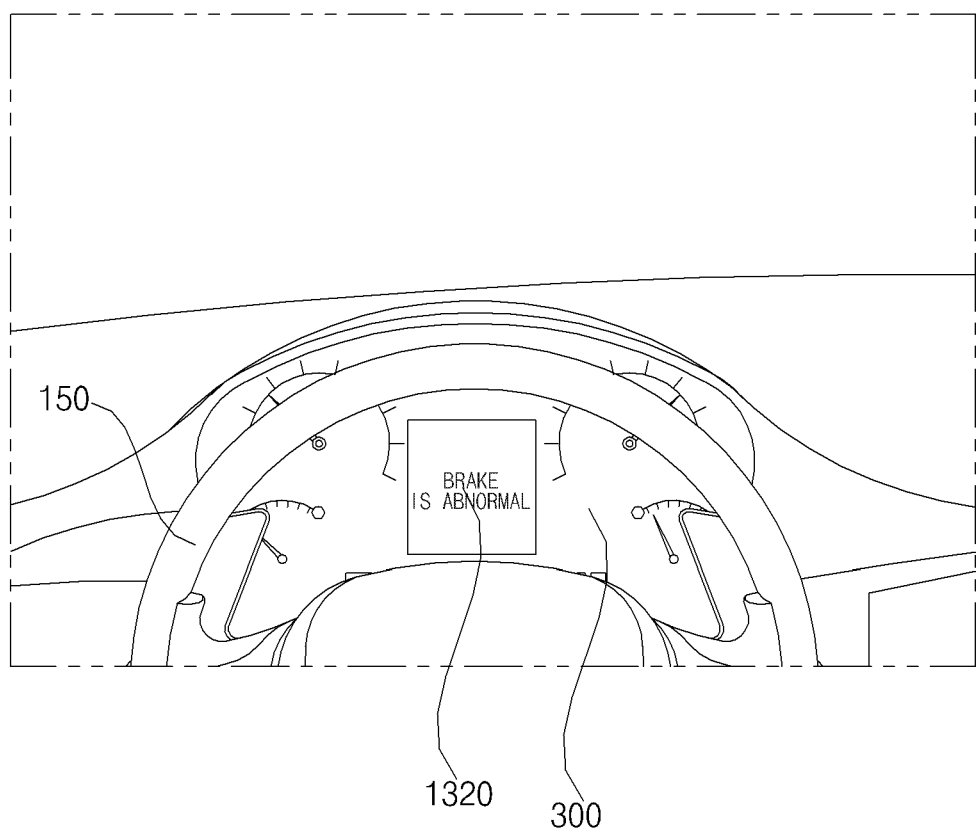
Figure 13C:
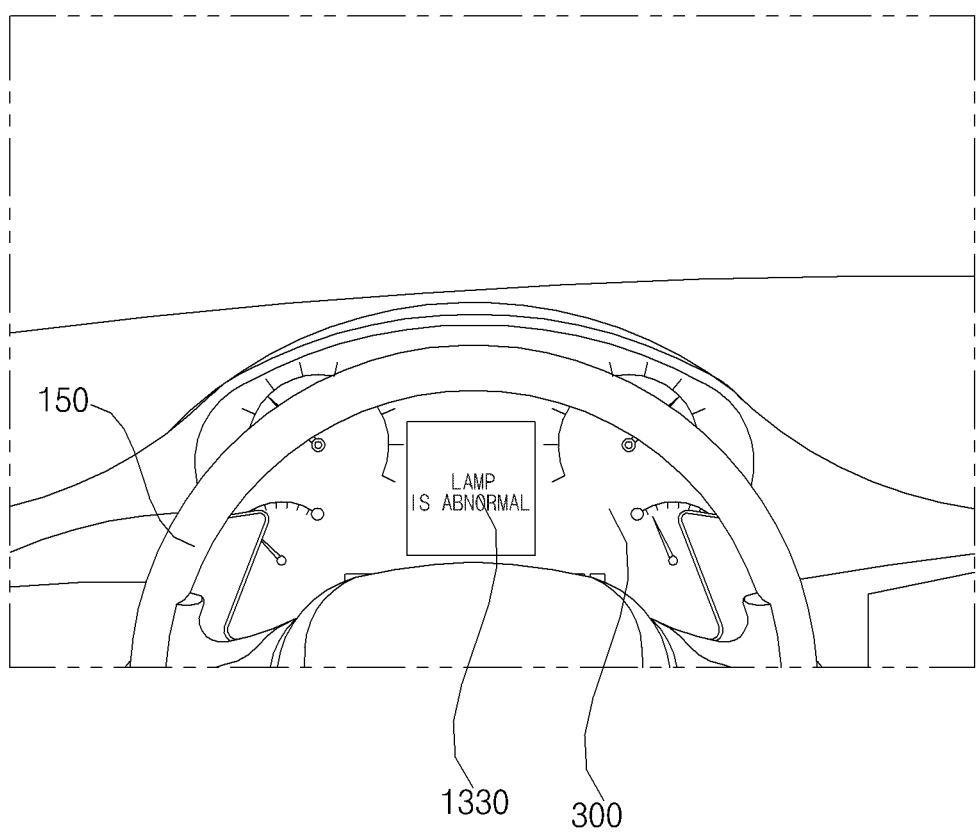

FIGS. 13A to 13C correspond to FIGS. 12(*a*) to 12(*c*), respectively, except that messages 1310, 1320, and 1330 are not displayed in the output region 800 but are displayed in a cluster 300 of the vehicle.

Meanwhile, the respective messages may be output through the audio output unit 185 unlike FIGS. 12 to 13C.

On the other hand, in a case in which the number of times an abnormality determination has been made is equal to or greater than a predetermined value, the processor 170 may control a message indicating that vehicle part replacement is needed to be output through at least of the display unit 180 and the audio output unit 185 or control an emergency lamp in the vehicle to be turned on, which will hereinafter be described with reference to FIGS. 14 to 15C.

Figure 14:
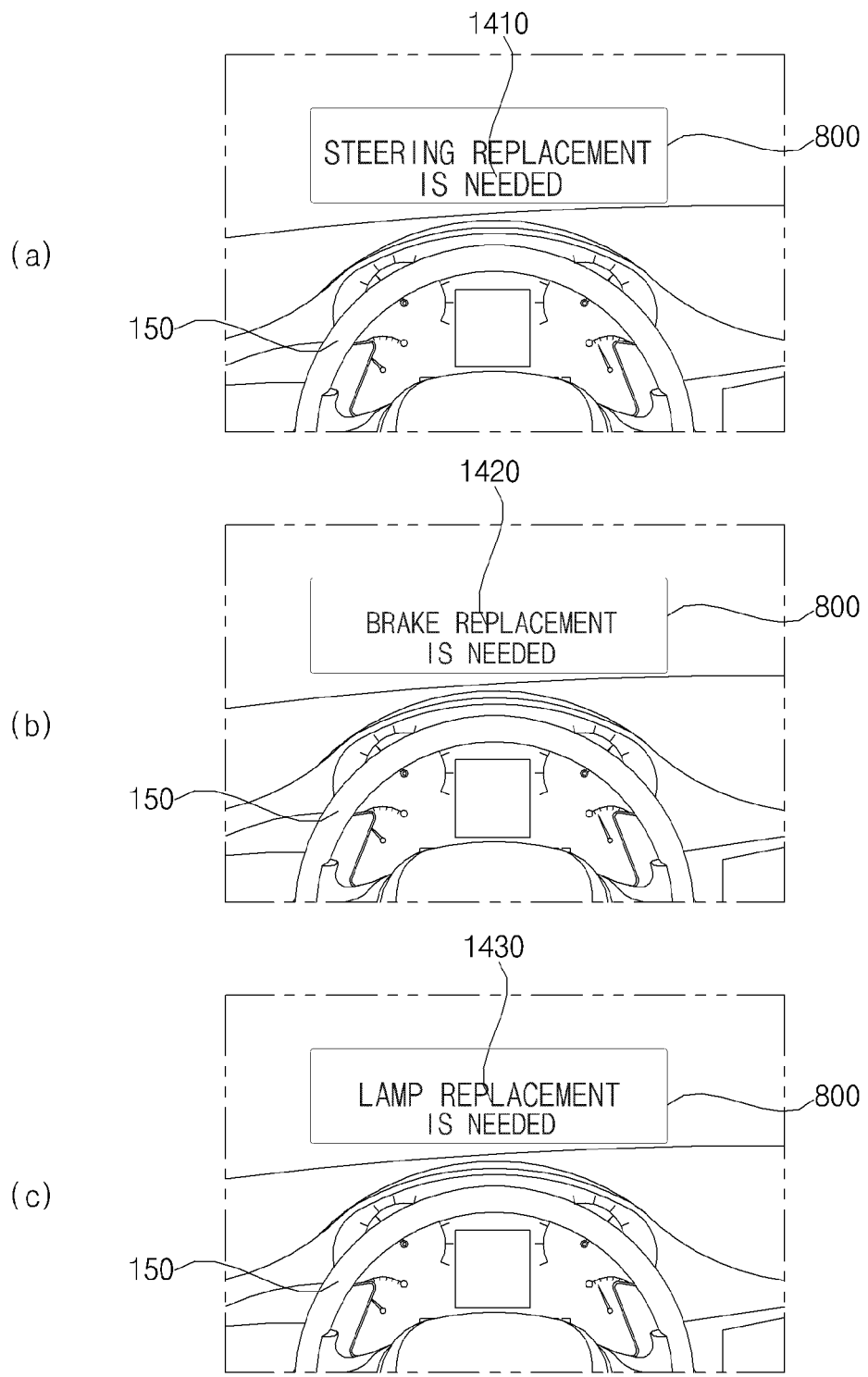

By way of example, FIG. 14(*a*) shows that the processor 170 outputs a message 1410 indicating that steering replacement is needed in a case in which the number of times a steering abnormality determination has been made is equal to or greater than a predetermined value. In a case in which the display unit is an HUD, the message 1410 indicating that steering replacement is needed may be output to the output region 800 on the front windshield glass of the vehicle. At this time, the message 1410 indicating that steering replacement is needed may include a message indicating that replacement of the steering apparatus is needed, a message indicating that replacement of the wheel alignment is needed, and a message indicating that replacement of the tire is needed.

FIG. 14(*b*) shows, by way of example, that the processor 170 outputs a message 1420 indicating that brake replacement is needed in a case in which the number of times a brake abnormality determination has been made is equal to or greater than a predetermined value. In FIG. 14(*b*), the message 1420 indicating that brake replacement is needed is displayed in the output region 800.

By way of example, FIG. 14(*c*) shows that the processor 170 outputs a message 1430 indicating that lamp replacement is needed in a case in which the number of times a lamp abnormality determination has been made is equal to or greater than a predetermined value. In FIG. 14(*c*), the message 1430 indicating that lamp replacement is needed is displayed in the output region 800.

Figure 15A:
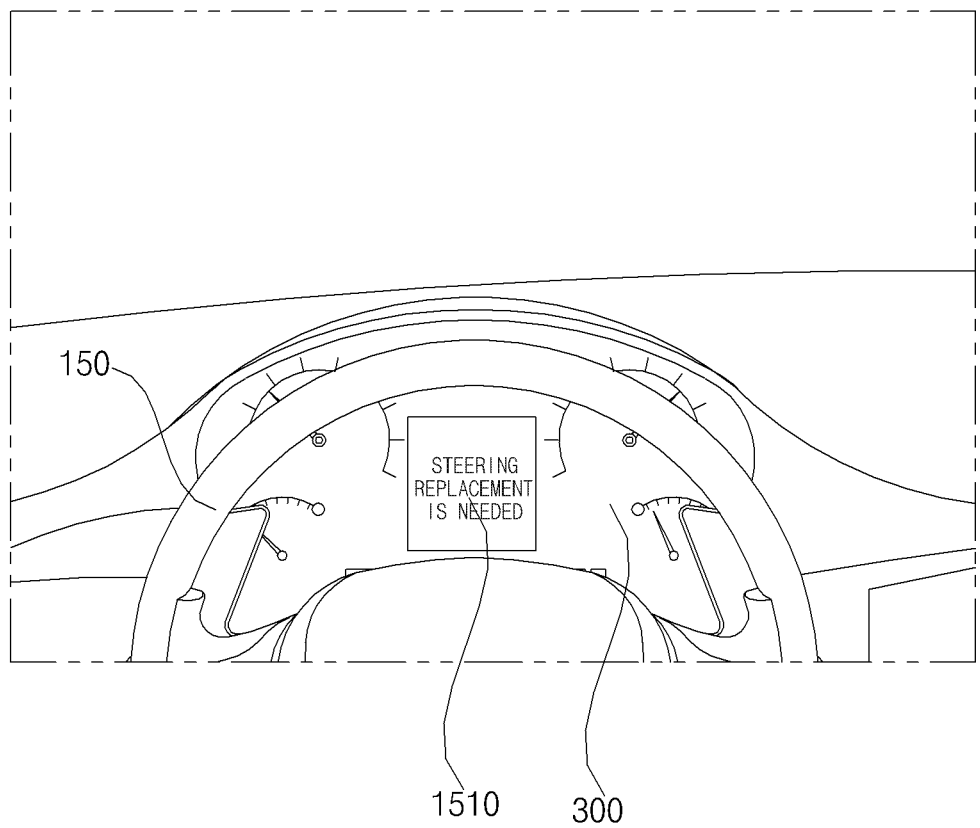
Figure 15B:
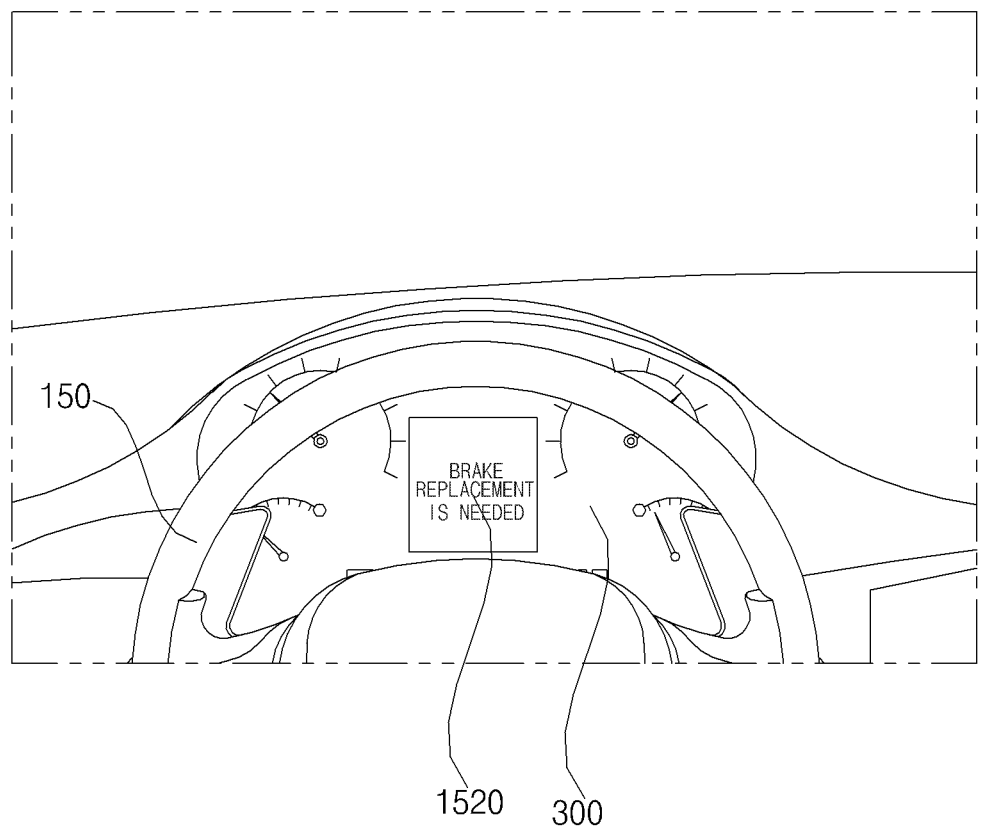
Figure 15C:
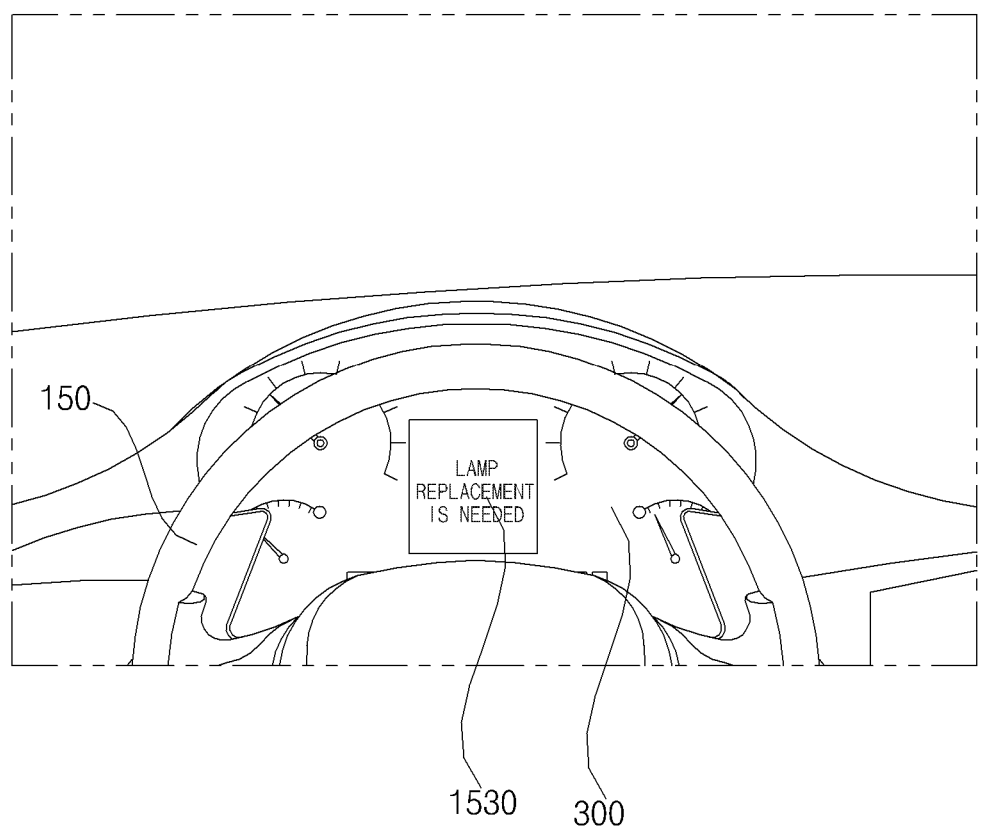

FIGS. 15A to 15C correspond to FIGS. 14(*a*) to 14(*c*), respectively, except that messages 1510, 1520, and 1530 are not displayed in the output region 800 but are displayed in the cluster 300 of the vehicle.

Meanwhile, the respective messages may be output through the audio output unit 185 unlike FIGS. 14 to 15C.

In addition, the processor 170 may control the communication unit 120 to transmit abnormality information based on an abnormality determination or a message indicating that a vehicle part replacement is needed to the mobile terminal 600 or the server 500, which will hereinafter be described with reference to FIG. 16.

Figure 16:
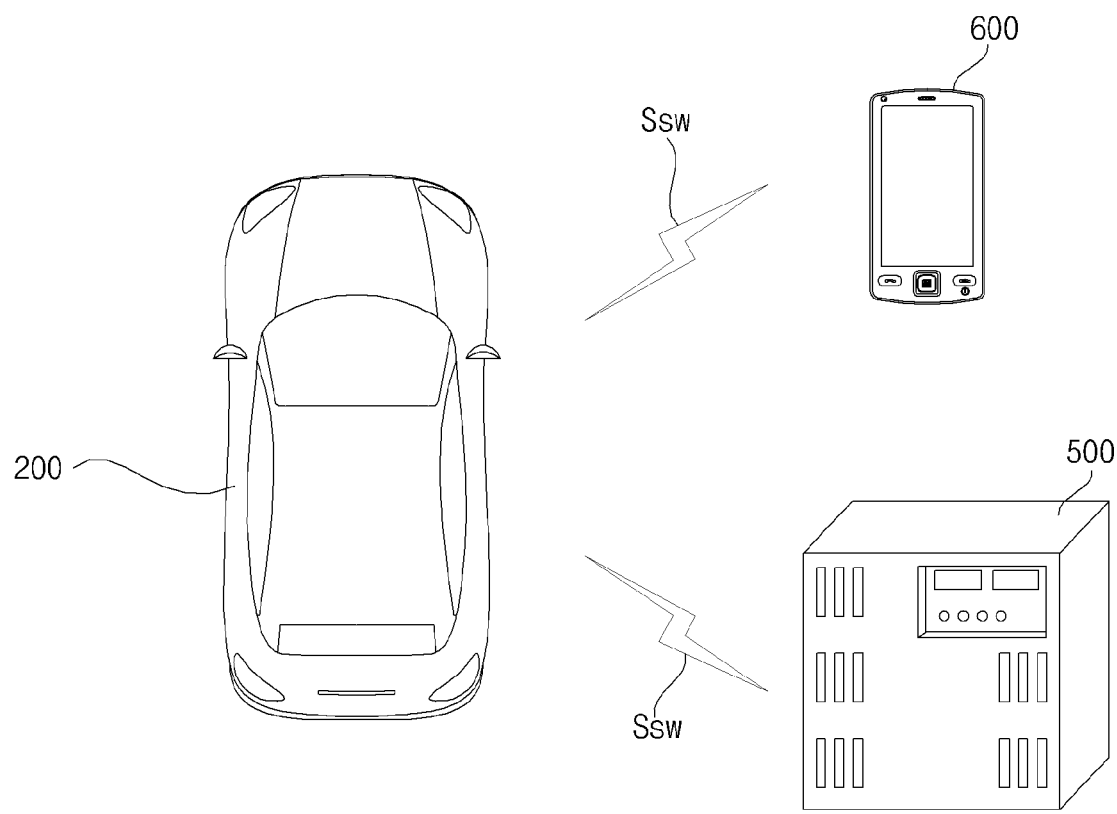

In a case in which the number of times a steering, brake, or lamp abnormality determination has been made is equal to or greater than the predetermined value as shown in FIGS. 14 to 15C, the processor 170 may transmit a message indicating that vehicle part replacement is needed to the mobile terminal 600 or the server 500 in the form of a wireless signal Ssw as shown in FIG. 16. As a result, it is possible for a user to easily and conveniently recognize the message indicating that vehicle part replacement is needed.

As the processor 170 in the vehicle informs that a vehicle part(s) of the vehicle is abnormal and that replacement of the abnormal vehicle part(s) is needed as described above, and user convenience is improved.

Although the steering apparatus, the brake apparatus, and the lamps are diagnosed in the above description, it is possible to diagnose the other parts of the vehicle.

The driver assistance apparatus according to the embodiment of the present disclosure and the vehicle including the same are not limited to the constructions and methods of the exemplary embodiments set forth herein. The exemplary embodiments may be selectively combined in part or in whole to form various embodiments.

Meanwhile, the operation method of the driver assistance apparatus or the vehicle according to the present disclosure may be implemented as code that can be written on a processor-readable recording medium and thus read by a processor provided in the driver assistance apparatus or the vehicle. The processor-readable recording medium may be any type of recording device in which data is stored in a processor-readable manner. The processor-readable recording medium may include, for example, a read only memory (ROM), a random access memory (RAM), a compact disc read only memory (CD-ROM), a magnetic tape, a floppy disc, and an optical data storage device and may be implemented in the form of a carrier wave transmitted over the Internet. The processor-readable recording medium can be distributed over a plurality of computer systems connected to a network such that processor-readable code is written thereto and executed therefrom in a decentralized manner.

As is apparent from the above description, in a driver assistance apparatus according to an embodiment of the present disclosure, it is possible to diagnose a part(s) of a vehicle based on stereo images received from a stereo camera and vehicle travel state information sensed by a sensor unit.

In particular, it is possible to determine whether at least one selected from among a steering apparatus, a tire, and a wheel alignment of the vehicle is abnormal based on the stereo images received from the stereo camera and the vehicle travel state information sensed by the sensor unit.

In addition, it is possible to determine that a brake apparatus is abnormal in a case in which a braking distance when the brake apparatus of the vehicle is driven is greater by a predetermined distance than a braking distance calculated based on the stereo images.

In addition, it is possible to detect a traffic sign or a road surface during travel of the vehicle in the nighttime based on the stereo images and to determine that a head lamp is abnormal in a case in which brightness data for the detected traffic sign or the detected road surface are equal to or less than a predetermined level.

In addition, it is possible to control a message indicating that part replacement is needed to be output through at least one selected from between a display unit and an audio output unit or to control an emergency lamp in the vehicle to be turned on in a case in which the number of times of abnormality determination is equal to or greater than a predetermined value, thereby improving user convenience.

In addition, it is possible to transmit abnormality information based on the abnormality determination or the message indicating that a vehicle part replacement is needed to a mobile terminal or a server, thereby improving user convenience.

In detection of an object based on the stereo images, on the other hand, it is possible to calculate a disparity using the stereo images and to detect an object based on the disparity information, thereby reducing data processing time.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A driver assistance apparatus comprising:
   a stereo camera to acquire stereo images;
   a sensor unit to sense a travel state of a vehicle; and
   a processor in communication with the stereo camera and the sensor unit, the processor to diagnose a part of the vehicle based on the stereo images received from the stereo camera and the vehicle travel state sensed by the sensor unit, wherein the processor calculates vehicle heading information based on the stereo images, detects vehicle heading information from a steering wheel sensor of the sensor unit, and determines whether a steering apparatus or a tire of the vehicle is abnormal based on the calculated vehicle heading information and the detected vehicle heading information.

2. The driver assistance apparatus according to claim 1, wherein the processor detects a lane marker based on the stereo images, calculates a distance between the detected lane marker and the vehicle, detects speed information and vehicle heading information from a speed sensor and a steering angle sensor of the sensor unit, calculates the distance between the lane marker and the vehicle based on the detected speed information and the detected vehicle heading information, and determines that at least one of the steering apparatus, a tire, and a wheel alignment of the vehicle is abnormal in a case in which a difference between the distance calculated based on the stereo images and the distance calculated based on the sensor information is equal to or greater than a predetermined value.

3. The driver assistance apparatus according to claim 1, wherein if a steering wheel of the vehicle is positioned within a predetermined range for forward travel of the vehicle and a heading of the vehicle detected based on the stereo images received from the stereo camera does not correspond to the predetermined range, the processor determines that a wheel alignment is abnormal.

4. The driver assistance apparatus according to claim 1, wherein
   the processor detects a preceding vehicle and a distance to the preceding vehicle based on the stereo images, and
   if a predicted distance to the preceding vehicle is greater by a predetermined distance than the distance to the preceding vehicle detected based on the stereo images when a brake apparatus of the vehicle is driven or if a braking distance when the brake apparatus of the vehicle is driven is greater by a predetermined distance than a braking distance calculated based on the stereo images, the processor determines that the brake apparatus is abnormal.

5. The driver assistance apparatus according to claim 1, wherein the processor detects a traffic sign or a road surface during travel of the vehicle in the nighttime based on the stereo images and determines that a head lamp is abnormal if brightness data for the detected traffic sign or the detected road surface are equal to or less than a predetermined level.

6. The driver assistance apparatus according to claim 1, further comprising:
   a display unit; and
   an audio output unit, wherein
   the processor controls abnormality information based on an abnormality determination, the abnormality information is output through at least one of the display unit and the audio output unit.

7. The driver assistance apparatus to claim 6, wherein, if the number of times the abnormality determination is made is equal to or greater than a predetermined value, the processor controls a message indicating that a vehicle part replacement is needed, the message is output through at least one of the display unit and the audio output unit or the processor controls an emergency lamp in the vehicle to be turned on.

8. The driver assistance apparatus according to claim 1, further comprising:
   a communication unit to communicate with a mobile terminal or a server, wherein the processor controls the communication unit to transmit the abnormality information based on the abnormality determination or a message indicating that vehicle part replacement is needed to the mobile terminal or the server.

9. The driver assistance apparatus according to claim 1, wherein the processor comprises:
a disparity calculator to calculate a disparity between the stereo images;
an object detector to detect an object for at least one of the stereo images based on the disparity information of the stereo images; and
an object tracking unit to track the detected object.

10. The driver assistance apparatus according to claim 9, wherein the processor further comprises:
a segmentation unit to segment an object in the stereo images based on the disparity information of the stereo images; and
an object verification unit to classify the detected object, wherein
the object detector detects an object for at least one of the stereo images based on the segmented object.

11. A vehicle comprising:
a steering drive unit to drive a steering apparatus;
a brake drive unit to drive a brake apparatus;
a controller to control the steering drive unit and the brake drive unit;
a stereo camera for acquiring stereo images;
a sensor unit to sense a travel state of a vehicle; and
a processor in communication with the steering drive unit, the brake drive unit, the controller to control the steering drive unit, the stereo camera and the sensor unit, the processor to diagnose a part of the vehicle based on the stereo images received from the stereo camera and the vehicle travel state sensed by the sensor unit.

12. The vehicle according to claim 11, wherein the processor calculates vehicle heading information based on the stereo images, detects vehicle heading information from a steering wheel sensor of the sensor unit, and determines whether the steering apparatus or a tire of the vehicle is abnormal based on the calculated vehicle heading information and the detected vehicle heading information.

13. The vehicle according to claim 11, wherein the processor detects a lane marker based on the stereo images, calculates a distance between the detected lane marker and the vehicle, detects speed information and vehicle heading information from a speed sensor and a steering angle sensor of the sensor unit, calculates the distance between the lane marker and the vehicle based on the detected speed information and the detected vehicle heading information, and determines that at least one selected from among the steering apparatus, a tire, and a wheel alignment of the vehicle is abnormal if a difference between the distance calculated based on the stereo images and the distance calculated based on the sensor information is equal to or greater than a predetermined value.

14. The vehicle according to claim 11, wherein if a steering wheel of the vehicle is positioned within a predetermined range for forward travel of the vehicle and a heading of the vehicle detected based on the stereo images received from the stereo camera does not correspond to the predetermined range, the processor determines that a wheel alignment is abnormal.

15. The vehicle according to claim 11, wherein
the processor detects a preceding vehicle and a distance to the preceding vehicle based on the stereo images, and
if a predicted distance to the preceding vehicle is greater by a predetermined distance than the distance to the preceding vehicle detected based on the stereo images when the brake apparatus of the vehicle is driven or in a case in which a braking distance when the brake apparatus of the vehicle is driven is greater by a predetermined distance than a braking distance calculated based on the stereo images, the processor determines that the brake apparatus is abnormal.

16. The vehicle according to claim 11, further comprising:
a head lamp, wherein if the processor detects a traffic sign or a road surface during travel of the vehicle in the nighttime based on the stereo images and determines that the head lamp is abnormal in a case in which brightness data for the detected traffic sign or the detected road surface are equal to or less than a predetermined level.

17. The vehicle according to claim 11, further comprising:
a display unit; and
an audio output unit, wherein
the processor or the controller controls abnormality information based on an abnormality determination, the abnormality information is output through at least one of the display unit and the audio output unit.

18. The vehicle according to claim 17, wherein if the number of times the abnormality determination is made is equal to or greater than a predetermined value, the processor controls a message indicating that vehicle part replacement is needed, the message is output through at least one of the display unit and the audio output unit or the processor controls an emergency lamp in the vehicle to be turned on.

19. The vehicle according to claim 12, further comprising:
a communication unit to communicate with a mobile terminal or a server, wherein the processor controls the communication unit to transmit the abnormality information based on the abnormality determination or a message indicating that vehicle part replacement is needed to the mobile terminal or the server.

* * * * *